United States Patent [19]

Papenberg

[11] Patent Number: 4,841,435

[45] Date of Patent: Jun. 20, 1989

[54] DATA ALIGNMENT SYSTEM FOR RANDOM AND BLOCK TRANSFERS OF EMBEDDED SUBARRAYS OF AN ARRAY ONTO A SYSTEM BUS

[75] Inventor: Robert L. Papenberg, San Jose, Calif.

[73] Assignee: Saxpy Computer Corporation, Sunnyvale, Calif.

[21] Appl. No.: 924,912

[22] Filed: Oct. 29, 1986

[51] Int. Cl.[4] ............... G06F 12/00; G06F 12/04; G06F 12/06; G06F 12/08

[52] U.S. Cl. ............................................ 364/200

[58] Field of Search ... 364/200 MS File, 900 MS File, 364/719, 730; 365/231, 235, 238

[56] References Cited

U.S. PATENT DOCUMENTS

| | | | |
|---|---|---|---|
| 3,497,760 | 2/1970 | Kiesling | 315/18 |
| 3,973,245 | 8/1976 | Belser | 340/172.5 |
| 4,112,487 | 9/1978 | Nutter et al. | 364/200 |
| 4,131,940 | 12/1978 | Moyer | 364/200 |
| 4,161,784 | 7/1979 | Cushing et al. | 364/748 |
| 4,187,551 | 2/1980 | Nutter et al. | 364/900 |
| 4,321,596 | 3/1982 | Hernandez et al. | 340/724 |
| 4,435,836 | 3/1984 | Rubin | 382/27 |
| 4,450,525 | 5/1984 | Demuth et al. | 364/200 |
| 4,542,376 | 9/1985 | Bass et al. | 340/724 |
| 4,543,665 | 9/1985 | Maeda | 382/34 |
| 4,555,700 | 11/1985 | Convis et al. | 340/721 |
| 4,555,802 | 11/1985 | Fedak et al. | 364/900 |
| 4,610,026 | 9/1986 | Tabata et al. | 382/47 |
| 4,630,230 | 12/1986 | Sundet | 364/900 |
| 4,660,143 | 4/1987 | King et al. | 364/200 |
| 4,706,191 | 11/1987 | Hamstra et al. | 364/200 |

*Primary Examiner*—Raulfe B. Zache
*Assistant Examiner*—Robert B. Harrell
*Attorney, Agent, or Firm*—Townsend & Townsend

[57] ABSTRACT

An alignment system for transferring only system words of a subarray embedded in an array in system memory between system memory and a buffer memory. The alignment system utilizes a parallel bus that transfers W system words per cycle and selects only subarray words for transfer between the system memory and the buffer. Additionally, a sequencer schedules and executes combinations of random and block accesses to mamximize bandwidth.

7 Claims, 11 Drawing Sheets

| | | | | | |
|---|---|---|---|---|---|
| $A_{00}$ | $A_{01}$ $B_{00}$ | $A_{02}$ | $A_{03}$ $B_{01}$ | $A_{04}$ | $A_{05}$ |
| $A_{10}$ | $A_{11}$ | $A_{12}$ | $A_{13}$ | $A_{14}$ | $A_{15}$ |
| $A_{20}$ | $A_{21}$ $B_{10}$ | $A_{22}$ | $A_{23}$ $B_{11}$ | $A_{24}$ | $A_{25}$ |
| $A_{30}$ | $A_{31}$ | $A_{32}$ | $A_{33}$ | $A_{34}$ | $A_{35}$ |
| $A_{40}$ | $A_{41}$ $B_{20}$ | $A_{42}$ | $A_{43}$ $B_{21}$ | $A_{44}$ | $A_{45}$ |

ARRAY SPACE

ARRAY SPACE

| $A_{00}$ | $A_{01}$ $B_{00}$ | $A_{02}$ | $A_{03}$ $B_{01}$ | $A_{04}$ | $A_{05}$ |
|---|---|---|---|---|---|
| $A_{10}$ | $A_{11}$ | $A_{12}$ | $A_{13}$ | $A_{14}$ | $A_{15}$ |
| $A_{20}$ | $A_{21}$ $B_{10}$ | $A_{22}$ | $A_{23}$ $B_{11}$ | $A_{24}$ | $A_{25}$ |
| $A_{30}$ | $A_{31}$ | $A_{32}$ | $A_{33}$ | $A_{34}$ | $A_{35}$ |
| $A_{40}$ | $A_{41}$ $B_{20}$ | $A_{42}$ | $A_{43}$ $B_{21}$ | $A_{44}$ | $A_{45}$ |

FIG._1A.

| | 0 | 1 | 2 | 3 | 4 | 5 | 6 | 7 |
|---|---|---|---|---|---|---|---|---|
| $A_{SM}$ WW1 | $A_{00}$ | $A_{10}$ | $A_{20}$ | $A_{30}$ | $A_{40}$ | $A_{01}$ $B_{00}$ | $A_{11}$ | $A_{21}$ $B_{10}$ |
| | 8 | 9 | 10 | 11 | 12 | 13 | 14 | 15 |
| $A_{SM}$ WW2 | $A_{31}$ | $A_{41}$ $B_{20}$ | $A_{02}$ | $A_{12}$ | $A_{22}$ | $A_{32}$ | $A_{42}$ | $A_{03}$ $B_{01}$ |
| | 16 | 17 | 18 | 19 | 20 | 21 | 22 | 23 |
| $A_{SM}$ WW3 | $A_{13}$ | $A_{23}$ $B_{11}$ | $A_{33}$ | $A_{43}$ $B_{21}$ | $A_{04}$ | $A_{14}$ | $A_{24}$ | $A_{34}$ |
| | 24 | 25 | 26 | 27 | 28 | 29 | 30 | 31 |
| $A_{SM}$ WW4 | $A_{44}$ | $A_{05}$ | $A_{15}$ | $A_{25}$ | $A_{35}$ | $A_{45}$ | — | — |

FIG._1B.

| 1 | $B_{00}$ |
|---|---|
| 2 | $B_{10}$ |
| 3 | $B_{20}$ |
| 4 | $B_{01}$ |
| 5 | $B_{11}$ |
| 6 | $B_{21}$ |

FIG._1C.

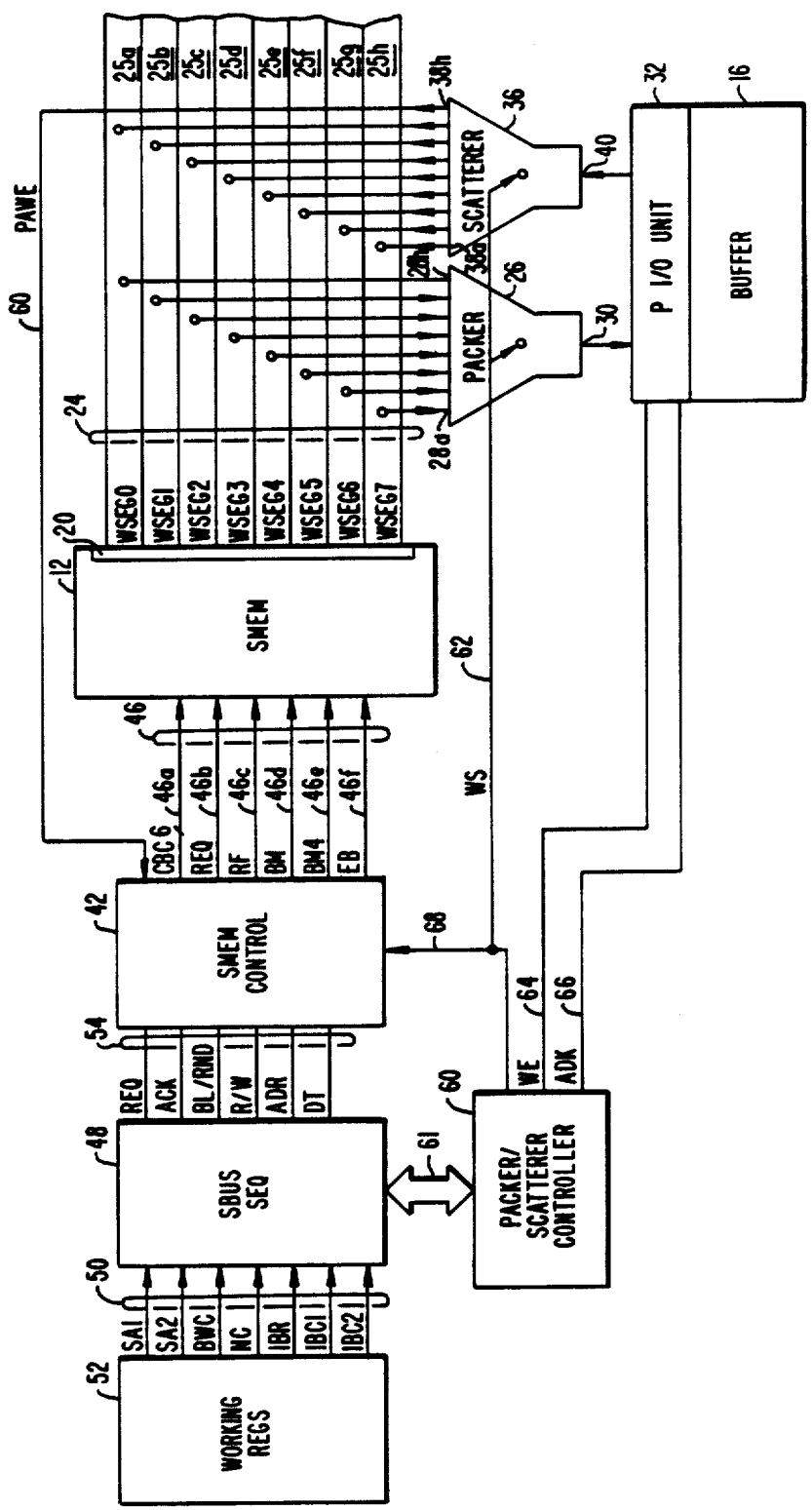
FIG._2A.

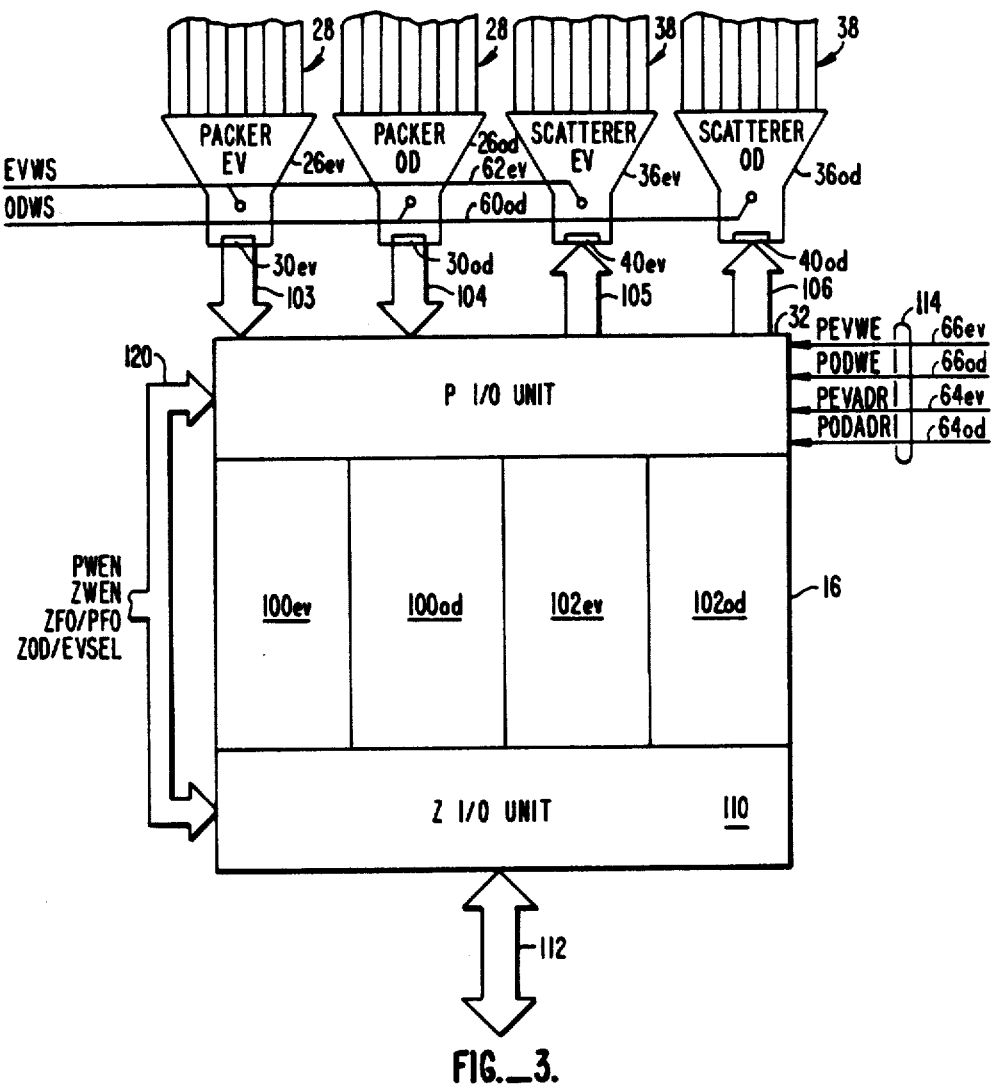
FIG._3.
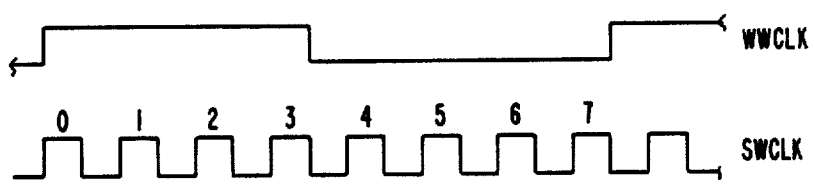
FIG._2B.

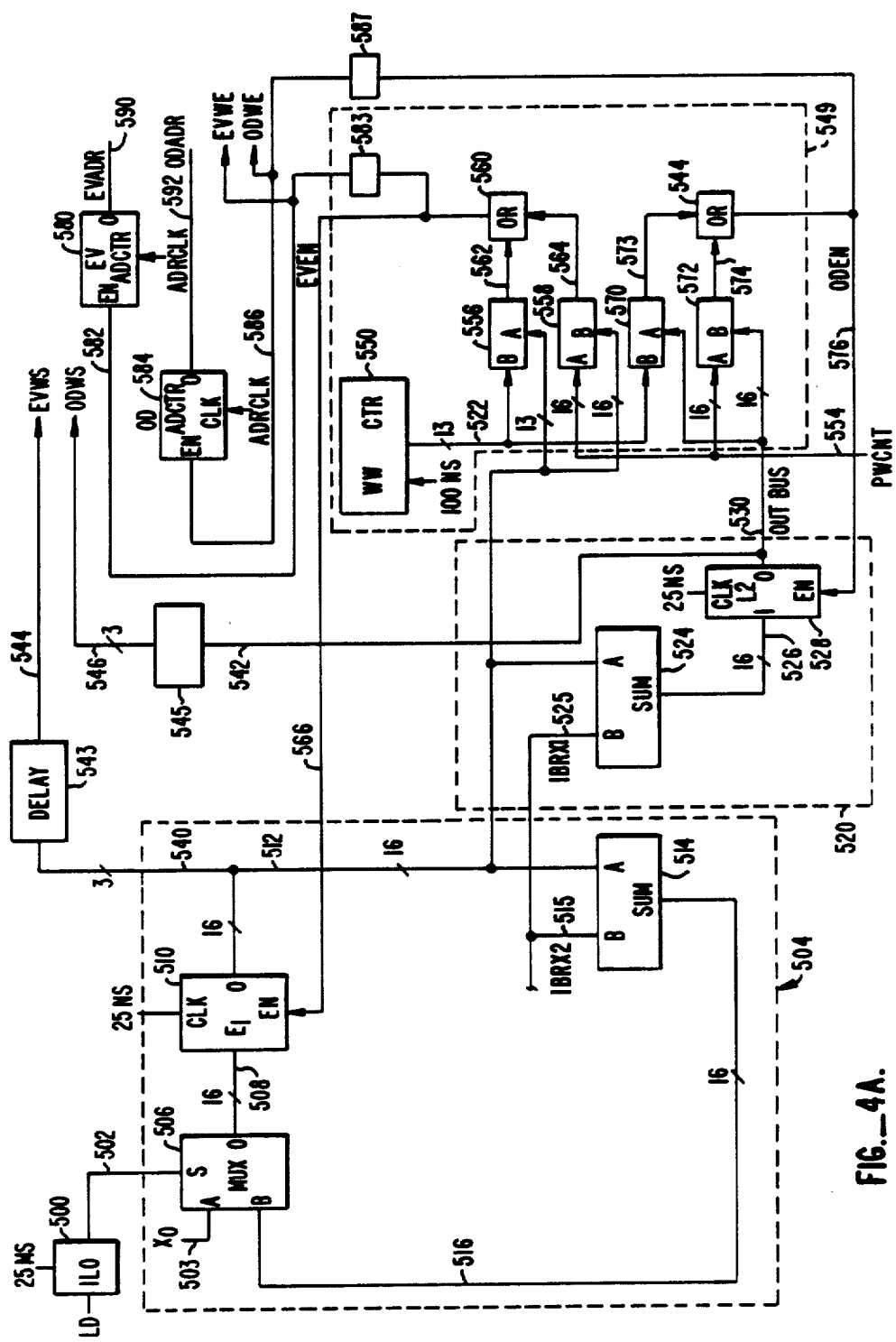
FIG.—4A.

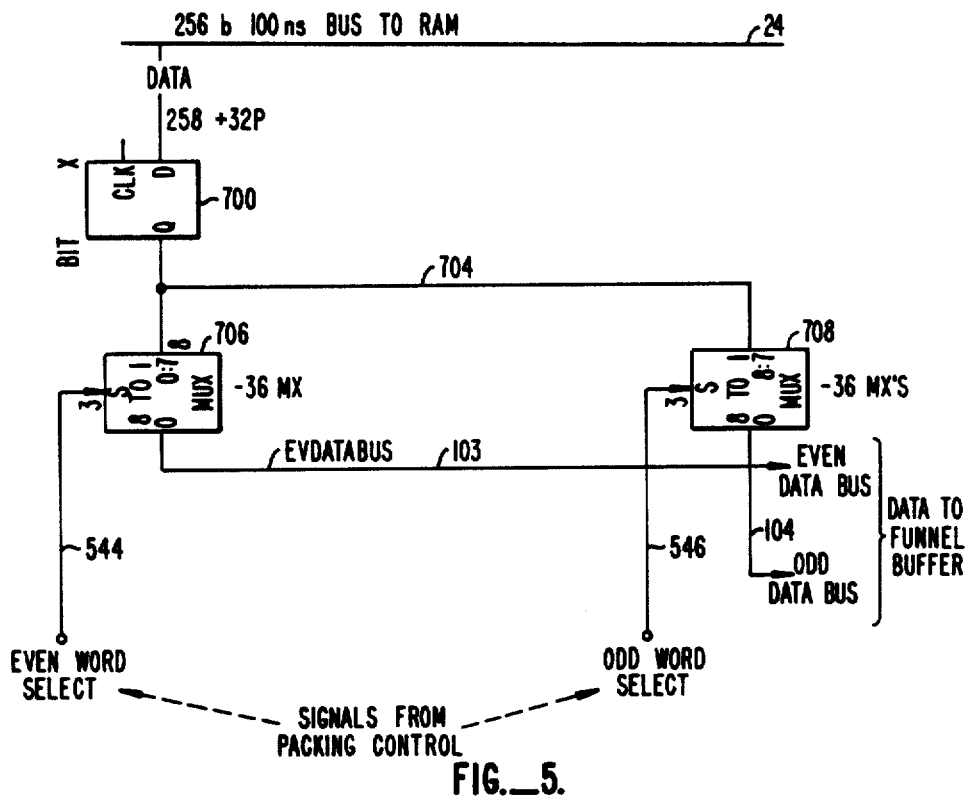

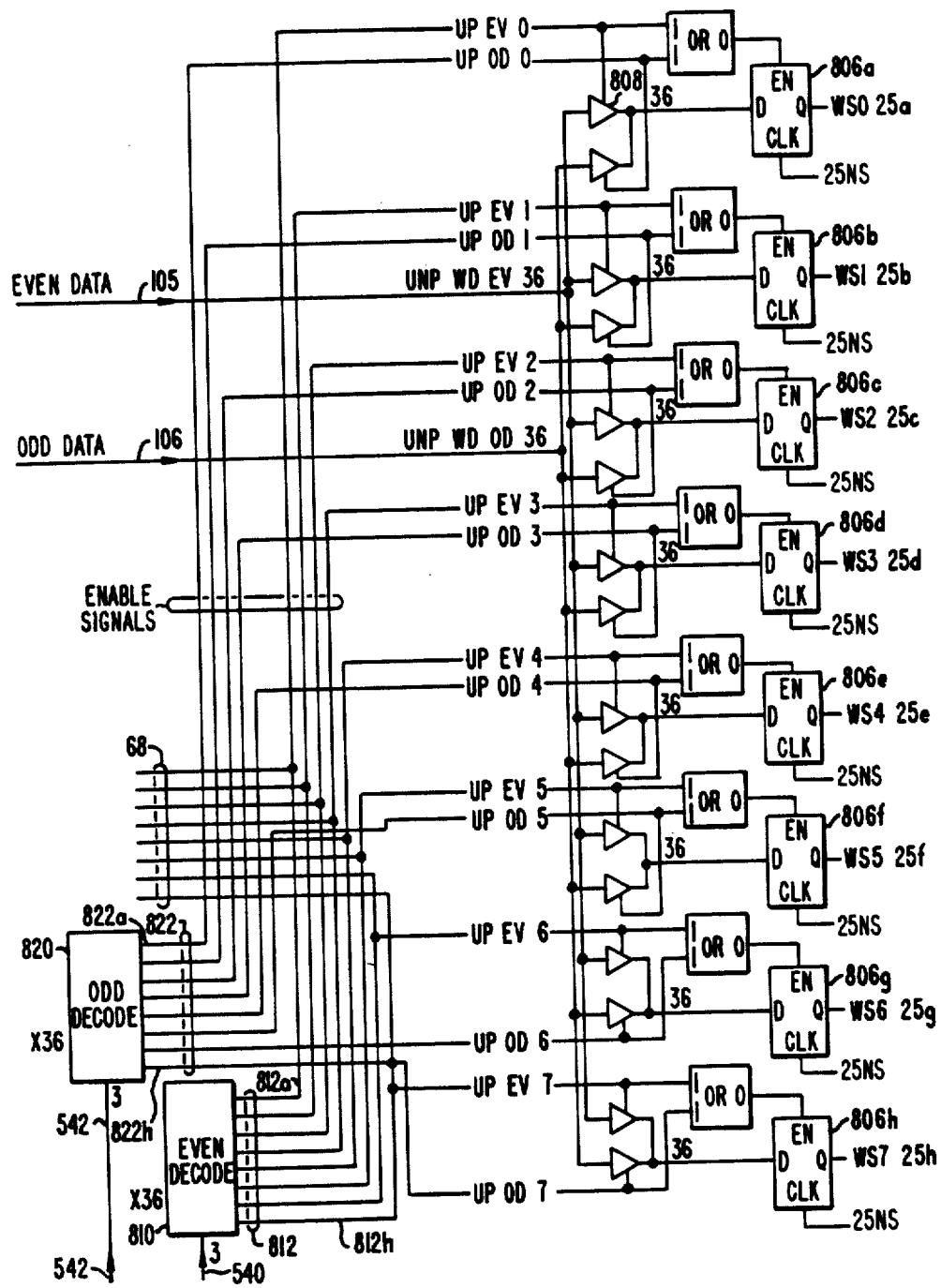
FIG._6.

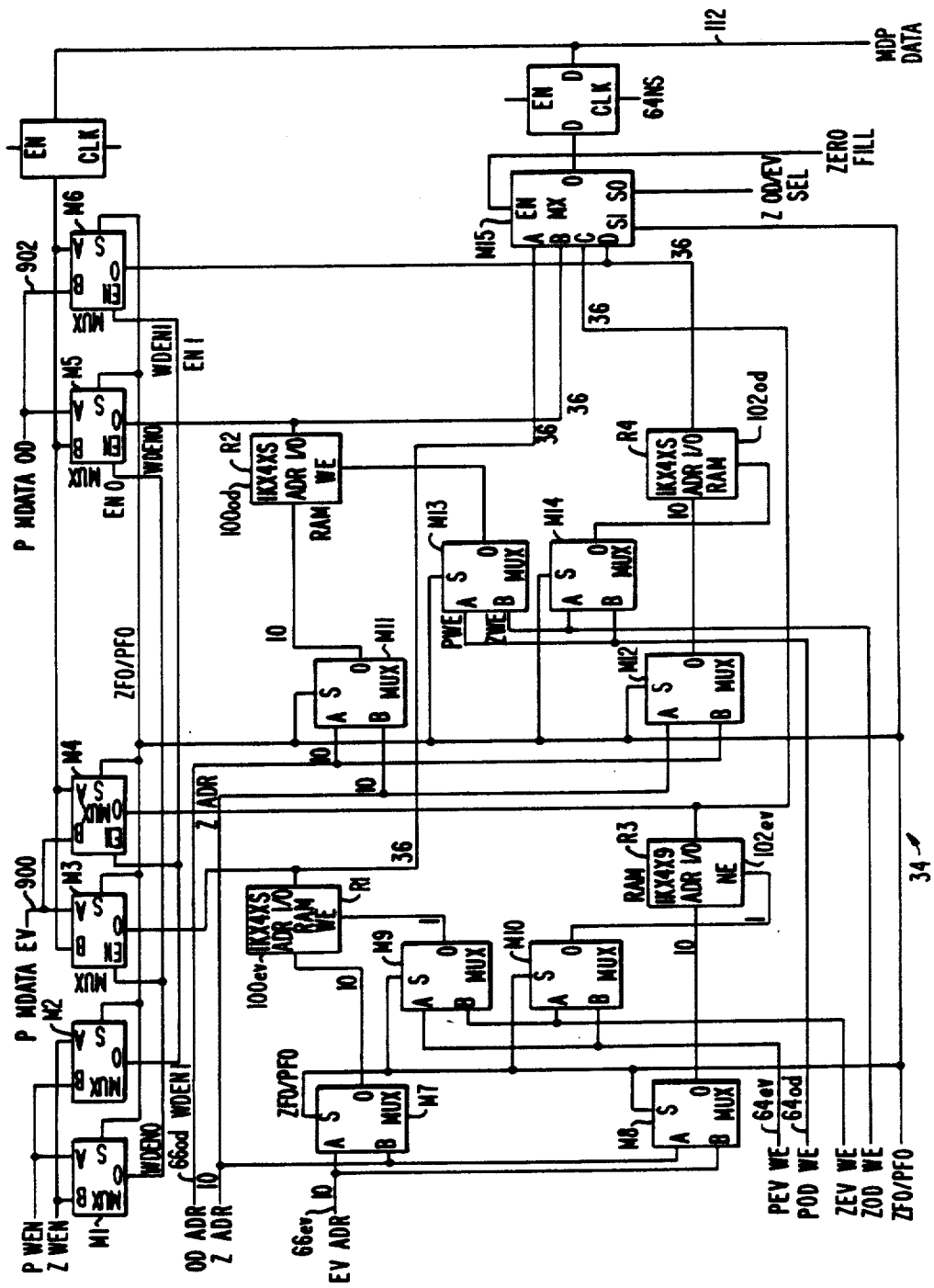
FIG._7.

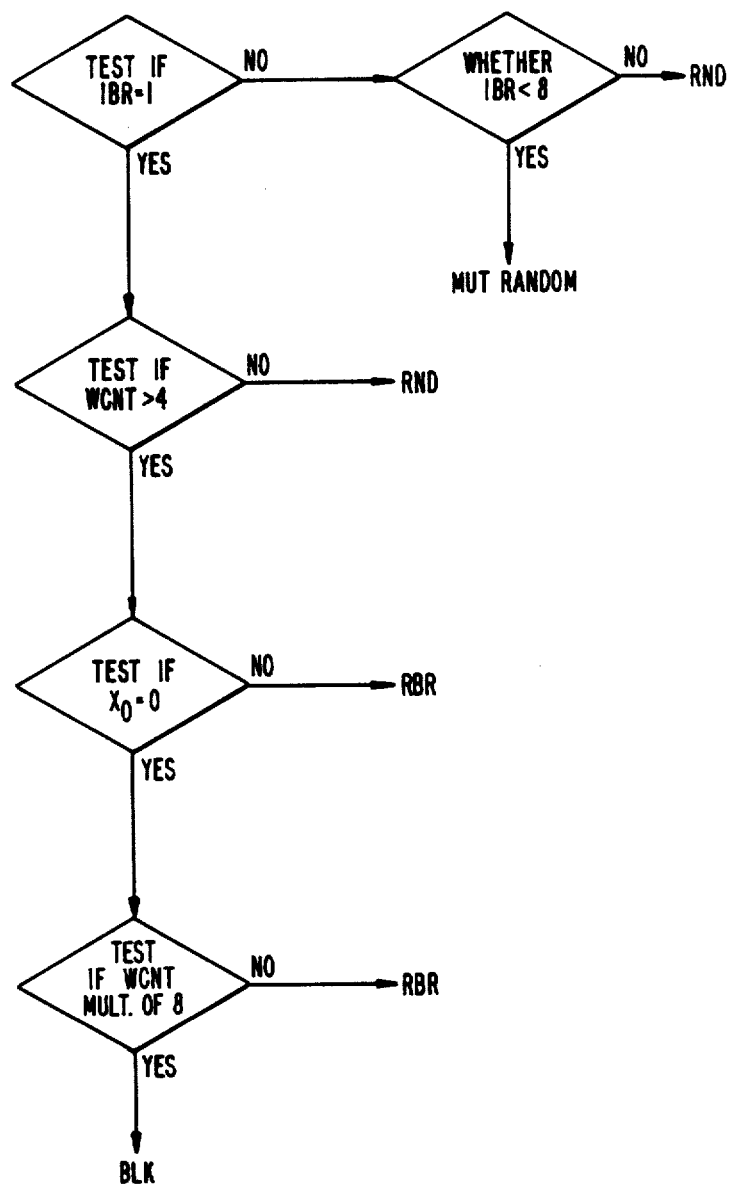
FIG._8.

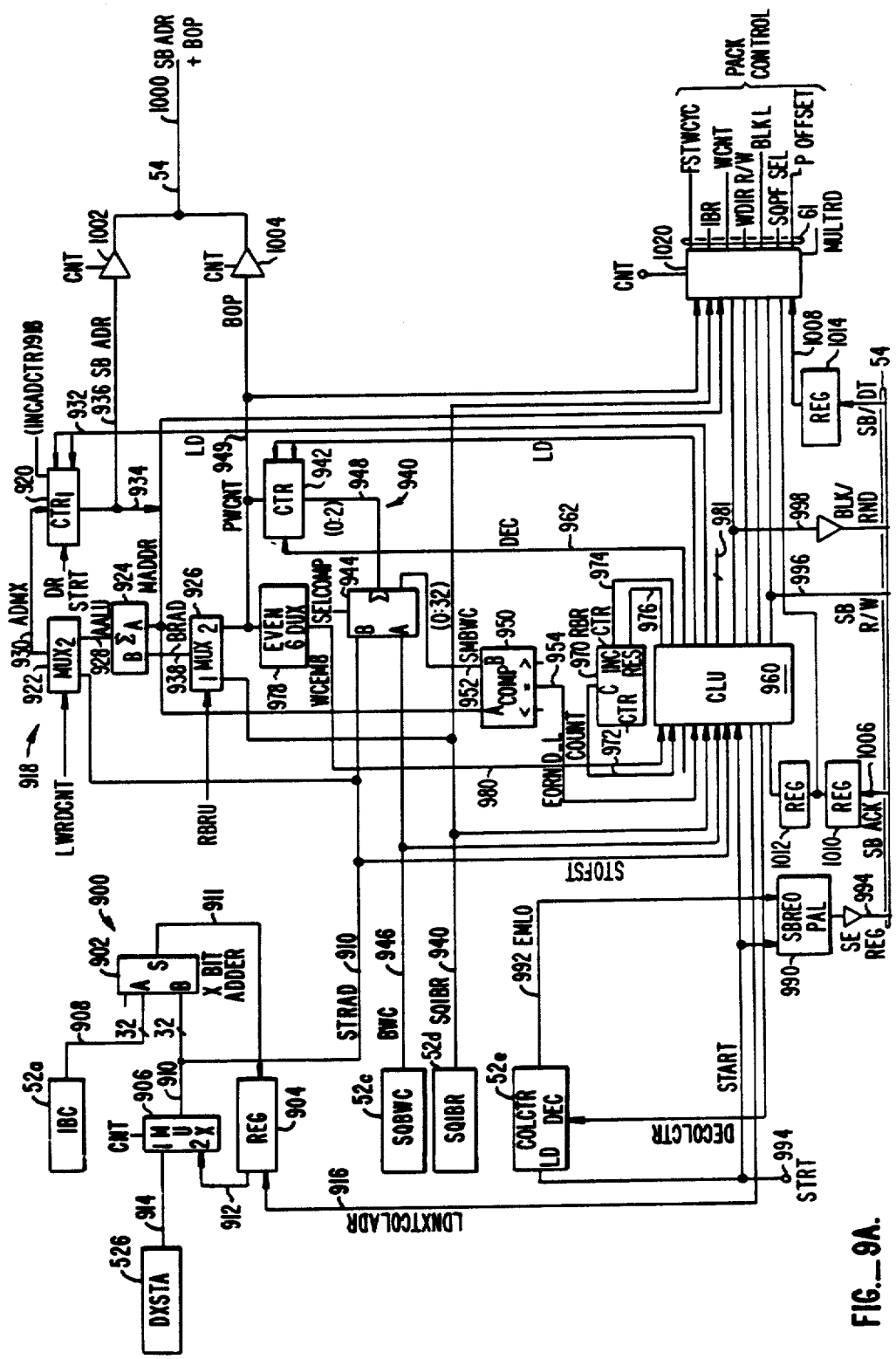
FIG._9A.

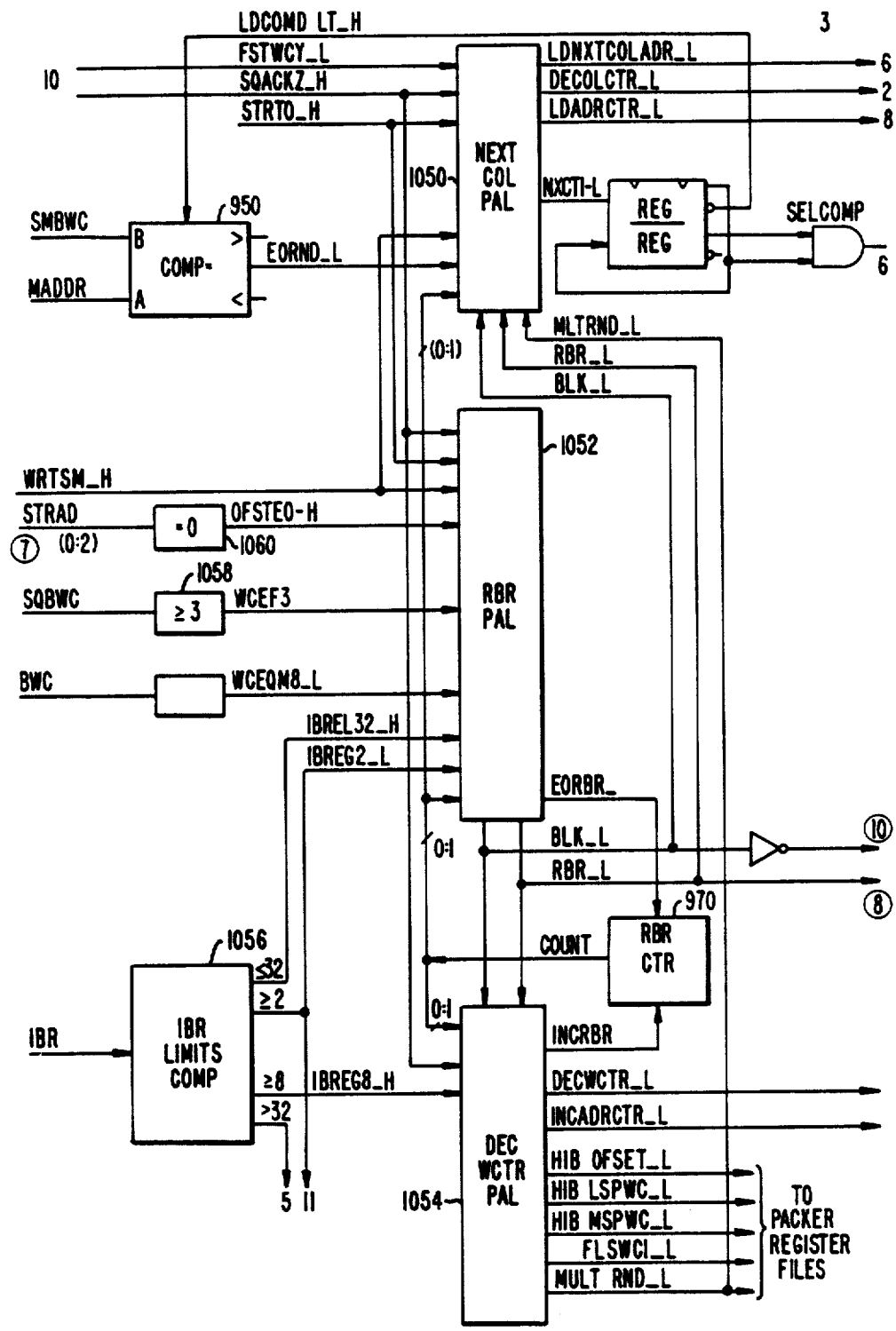
FIG._9B.

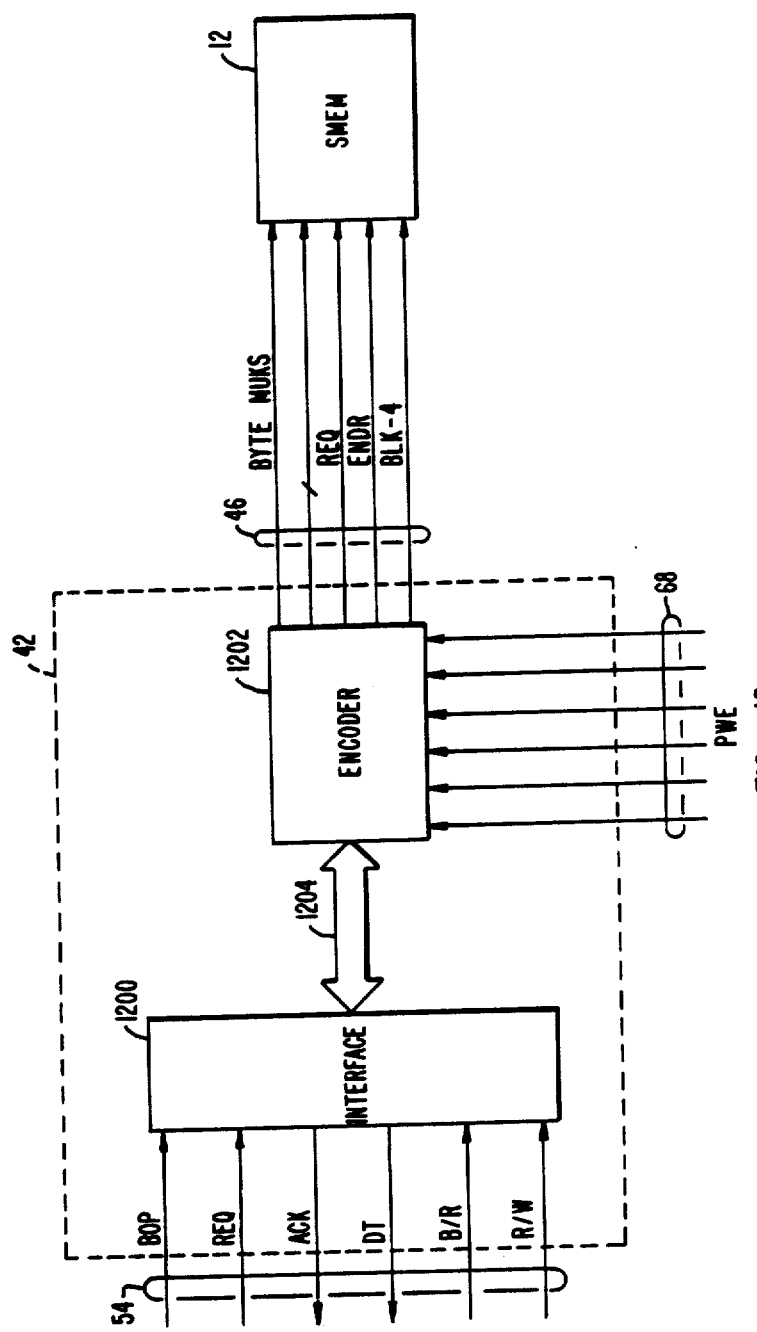
FIG.—10.

DATA ALIGNMENT SYSTEM FOR RANDOM AND BLOCK TRANSFERS OF EMBEDDED SUBARRAYS OF AN ARRAY ONTO A SYSTEM BUS

BACKGROUND OF THE INVENTION

The invention relates generally to data transfer systems and relates more particularly to a system for transferring data between two electronic memories.

A growing class of problems, such as seismic processing, numerical analysis, image processing, and signal processing, require a computer capable of performing operations involving multidimensional arrays of data stored in a computer memory.

The array may represent, for example, a matrix, and the operations performed include matrix-matrix multiply, matrix inversion, and so on.

The data in a two-dimensional array is represented by $D_{i,j}$ where the index i represents the row number and k the column number of the location in the array of the data element. Typically, the array is stored in one long block of storge elements in a computer memory. For example, the first column of an M×M array is stored in storage elements START to START+M. Thus, subsequent elements in the same column may be stored in physically adjacent, sequentially addressed, storage elements and subsequent elements in the same row are spaced by M storage locations.

A random access memory (RAM) is characterized by a minimum access time indicating the interval between a request for data and the receipt of the first data. The memory cycle time is the time interval between accesses.

A RAM may have a block access mode as well as random access mode. The block access R/W mode is utilized to decrease the cycle time of the RAM. In block access, N sequentially addressed words are serially transferred between the main RAM and a system bus. The cycle time is reduced below the random access time for all words in the block following the first word. The block access requires a set up time. However, once the block access is set up the cycle time of the block access mode is less than the random mode. For example, a RAM with a random access time of 300 ns may have a 100 ns cycle time in the block access mode with the block set up time being 600 ns.

Thus, if a sequence of words is to be accessed the block mode may be utilized to decrease the overall access time for the block.

In many applications, several, e.g. four, parallel RAM elements are coupled to a parallel bus to form a system memory. Each address is provided to every RAM. If each RAM element transfers a two system word data element between its I/O port and the system bus in response to an address signal, then a wide word comprising eight processor words is transferred between the main RAM I/O port and the system bus. Each processor word is carried on a word-segment of the bus.

The sections of a given wide word stored in each RAM segment have identical addresses. Accordingly, a single address accesses the wide word in the main RAM.

In many instances, matrix, or other array operations only require the data elements, $S_{i,j}$, forming a subarray embedded in the array D. Typically, these elements, $S_{i,j}$, are transferred from the main array to a buffer of the matrix processor. Alternatively, the results of an operation may modify only a subarray of the stored array. Only the modified elements need be written into the system RAM.

The parallel access of wide words, including several system words, on each memory cycle provides for a very high data transfer rate from the memory.

However, for a subarray dispersed in the data array, a large number of unneeded data words, or fluff, will be transferred. If subarray data and fluff transferred from the system are loaded into a processor buffer several problems result. For example, the buffer must be much larger than needed just to accommodate subarray data. Additionally, before processing the subarray data, the subarray data must be separated from the fluff.

Additionally, for a given subarray, a read or write operation to the system memory may be accomplished by various combinations of random or block accesses. However, certain ones of those combinations, depending on the specific parameters of the subarray and other system constraints, will minimize the cycle time to transfer the words in the subarray between the system memory and the buffer.

Accordingly, a system for separating fluff from subarray data while providing the high data transfer rates achievable in a parallel system having a block access mode is needed to facilitate high speed processing of arrays and subarrays of data.

SUMMARY OF THE INVENTION

The present invention is a system for tranferring data between an embedded subarray of a system memory (SMEM) and a buffer memory at a high rate. The data transfer system includes a parallel bus that is selectively coupled to a set of W sequentially addressed storage elements. Each storage element in the SMEM stores a system word and the set of W sequentially addressed storage elements comprises a wide word (WW). The first and last words in a given WW define the left and right boundaries, respectively, of that WW.

Typically, an array of data is stored, column by column in sequentially addressed storage elements. The array is characterized by parameters including the starting address, number of elements in a row, and number of columns in the array.

An embedded subarray in the array is not necessarily aligned with the beginning or end of the array and may contain gaps between the elements in a row and the end of one column and the beginning of another. The gaps between elements in a row are defined by an increment between rows (IBR) parameter specifying the number of storage elements between succeeding subarray elements in a row. The gaps between columns are defined by an increment between columns (IBC) parameter.

The function of the present invention is to transfer only system words stored in the subarray storage elements between the parallel bus and the buffer memory. These system words are referred to as subarray words. However, there are several cases where some of the system words in a given WW on the bus are not subarray words. For example, if the first word of the subarray is offset from the left boundary of the WW then those system words to the left of the offset are not subarray words and are not to be transferred between the parallel bus and the buffer. Similarly, if the last word of the subarray is positioned to the left of the right WW boundary then words to the right of this last subarray word are not to be transferred. Also, if IBR≠1, then non-subarray words will necessarily be included in each WW.

In a preferred embodiment, the parallel bus includes W word-segments coupled to respective storage elements in a selected WW of the SMEM. A W:1 packer MUX controllably couples one of the W word-segments to the input port of the buffer and a 1:W scattering DEMUX controllably couples the output port of the buffer to one of the word-segments.

A packer/scatterer controller receives externally specified parameters defining a selected subarray. As successive WWs are coupled to the bus, the packer/scatterer controller generates signals to control the buffer and packer (for SMEM) read) or scatterer (for SMEM write) to transfer only subarray words between the parallel bus and the buffer.

Another aspect of the invention is directed to maximizing the data transfer rate of subarray words between the SMEM and the buffer. The SMEM includes a random transfer mode and a block transfer mode. A sequencer receives parameters defining the subarray and generates initialization and sequencing signals to schedule combinations of random and block transfers to maximize the bandwidth of the system.

According to a further aspect of the invention, the packer/scatterer controller and sequencer are hardwired embodiments utilizing ALUs and PALs to facilitate high-speed operation.

According to a still further aspect of the invention, an interleaved embodiment including odd and even buffer modules and packer and scatterer units is utilized.

Other features and advantages of the present invention will become apparent in view of the following detailed description and appended claims.

BRIEF DESCRIPTION OF THE DRAWINGS

FIG. 1A is a diagram of a data array and an embedded subarray.

FIG. 1B is a diagram depicting the physical storage of the data array and embedded subarray in the system memory.

FIG. 1C is a diagram depicting the physical storage of the subarray in the buffer.

FIG. 2A is a block diagram of the data alignment system.

FIG. 2B is a timing diagram relating to the operation of the system.

FIG. 3 is a block diagram of a dual-ported, interleaved buffer memory.

FIG. 4A is a schematic diagram of the packer/scatterer control system.

FIG. 4B is a timing diagram depicting labelled SWCLK pulses.

FIG. 4C is a diagram depicting the physical storage of the C subarray.

FIG. 5 is a schematic diagram of the packer.

FIG. 6 is a schematic diagram of the scatterer.

FIG. 7 is a schematic diagram of a dual ported funnel buffer.

FIG. 8 is a flow chart depicting the SBUS SEQ decision tree.

FIG. 9A is a schematic diagram of the SBUS SEQ.

FIG. 9B is a schematic diagram of the control logic unit.

FIG. 10 is a schematic diagram of the SMEM CNT.

DETAILED DESCRIPTION OF THE PREFERRED EMBODIMENTS

The present invention is a system for transferring only the data element stored in an embedded subarray of storage elements between a system memory (SMEM) and an external buffer memory. The invention also includes a system for sequencing block and random accesses, to and from the SMEM, to optimize the transfer rate subarray data between SMEM and the external buffer.

Referring to FIG. 1A, the concept of a data array containing an embedded subarray is illustrated. The data array is a matrix of rows and columns. Each element, $A_{ij}$, is included in a row identified by the index i and a column identified by the index j. In FIG. 1A the rows are depicted as being horizontal and the columns are depicted as being vertical. The geometric orientation of the rows and columns is arbitrary and does not limit the scope of the invention. An imbedded array, $B_{ij}$, is also depicted. The correspondence between the elements of the array A and the elements of the embedded subarray, B, are as follows.

$A_{01} = B_{00}$ $A_{21} = B_{10}$ $A_{41} = B_{20}$ $A_{03} = B_{01}$ $A_{23} = B_{11}$ $A_{43} = B_{21}$

It is emphasized that the array depicted in FIG. 1A is conceptual and does not correspond to the actual physical layout of the array in the SMEM.

FIG. 1B is a depiction of the organization of the physical memory and the system for storing the array elements therein. The physical memory 10 includes rows 12 having eight storage elements 14. Each row is identified by a wide word (WW) address, $A_{WW}$. In FIG. 1B, the top row is the first wide word, the second row is the second wide word, etc. Additionally, each system word is given a sequential system address $A_{sm}$, with the storage elements 14 numbered sequentially starting from 0 across each row 12. Two alternative addressing schemes may be utilized to identify a given storage element 14 in the memory 10. First, the number corresponding to the system memory address, $A_{sm}$, may be given. Secondly, the wide word address, $A_{WW}$, and the offset, X, within the wide word may be specified. For example, the first element of the B storage element, $B_{00}$, is identified by $A_{sm}=5$. Alternatively, the location of $B_{00}$ could be given by the wide word address, $A_{WW}=1$ and the offset $X=5$. The correspondence between the system word address, $A_{sm}$ and the ordered pair ($A_{WW}$, X) is given by the following equation:

$$A_{SM} = (A_W - 1)W + X \qquad \text{EQ. 1}$$

where W is the number of storage elements in a wide word. For the embodiment illustrated in FIG. 1B, $W=8$.

Five parameters for identifying the embedded subarray, $B_{ij}$, will now be described. Note that elements in the column of the array, $A_{ij}$, are stored in sequential storage elements 14. For example, the first five elements of the first column of the subarray $A_{ij}$ are stored at $A_{sm}=0$ through 4. The second column is stored at $A_{sm}=5$ through 9. Also, note that, in general, there is no correspondence between the conceptual arrangement of the array and the physical arrangement of the array. That is, the rows and columns of the array A are not stored in rows and columns of the system memory 10. This is true in general because the rows in the SMEM are of a fixed width, W, and the length of the columns in the array, $A_{ij}$ may be of arbitrary length.

The embedded subarray, $B_{ij}$, is defined by a starting address (STA) an increment between rows (IBR), a block word count (BWC), and a number of columns (NC). The definitions of the parameters will be illustrated with respect to the subarray $B_{ij}$ of the FIGS. 1A and 1B. The starting address of $B_{ij}$ is given by the $A_{sm}$ of the storage element of $B_{00}$. In the illustrated example, STA=5. The increment between rows (IBR) is the number of storage elements 14 between successive data of the subarray in a given column. In the illustrated example, the IBR=2. Note that the elements of the first column of the subarray $B_{ij}$ are located at ASM=5, 7, and 9. The block word count is defined as (NR-1)IBR where NR is the number of rows of the subarray. For the subarray $B_{ij}$, the number of rows is 3, the increment between rows is 2, and thus BWC=4. The increment between columns (IBC) is the difference between the $A_{sm}$ of the first element in a given column of the subarray and the $A_{sm}$ of the first element in the immediately succeeding column of the subarray. For the subarray $B_{ij}$, the first element of the first column is stored at $A_{sm}=5$, and the first element of the second column is stored at $A_{sm}=15$. Thus, IBC=10.

For the array, A, STA=0, IBR=1, BWC=5, and IBC=5. Note that BWC=IBC because IBR=1.

The system memory address, $A_{sm}$ of any element in the array $A_{ij}$ or the subarray $B_{ij}$ is given by the following formulae:

$$A_{SM}(A_{IJ}) = STA(A) + I(IBR(A)) + J(IBC(A)) \quad \text{EQ. 2}$$

and $$A_{SM}(B_{IJ}) = STA(B) + I(IBR(B)) + J(IBC(B)) \quad \text{EQ. 3}$$

In practice, a 32-bit digital word is utilized to address a specific storage element 14 in the memory array 10. Only the most significant 29 bits of this address are provided to the memory array 10 and form a wide word address, $A_{WW}$, to select a given wide word 12 of the memory 10. As will be described more fully below, during an access all of the storage elements 14 in the selected wide word 12 are coupled to a system bus. The least three significant bits of the 32 bit address are utilized as the offset, X, of the various storage elements 14 in the given wide word 12.

The general problem that is solved by the present invention can now be understood with reference to FIGS. 1A and 1B. During a read operation from the SMEM 10 to a buffer memory, all the elements on a selected wide word are coupled to a system bus. Examining the first wide word, it is noted that only the word stored at the storage locations 14 having $A_{sm}$ equal to 5 and 7 are included in the desired subarray. However, all the system words stored in storage elements 14 having $A_{sm}$ from zero to seven are transferred to the system bus. Accordingly, a system for transferring only the two out of eight words included in the subarray to the buffer while ignoring the six words not included in the subarray is needed to eliminate the fluff.

The desired final state is illustrated in FIG. 1C. The elements of the subarray, $B_{ij}$, have been transferred to a buffer memory 16, while data elements (fluff) not included in the subarray have not been transferred to the buffer memory 16.

FIG. 2 is a block diagram of the system of the present invention. The system memory 12 has an I/O port 20 coupled to a system bus 24. The system bus 24 includes n conductors, corresponding to the number of bits in a wide word of the SMEM 12. These conductors are grouped into eight word-segments 25a-h, with the number of conductors in each word-segment equal to the number Of bits stored in a storage element 14 of the SMEM 12. The I/O port 20 and SBUS 24 are connected so that the first storage element 14 in a given wide word 12 is coupled to the first word-segment 25a, the second storage element 14 in given wide word 12 is coupled to the second word-segment 25b, and so on, during a read or write operation of the SMEM 12. As described above, the particular wide word coupled to the SBUS is determined by the first twenty-nine bits of the 32-bit $A_{sm}$ address signal.

A packer 26 has eight input ports 28a-h with a first input port 28a coupled to the first word-segment 25a of the SBUS 24, a second input port 28b coupled to the second word-segment 25b of the SBUS 24, and so on. The packer has an output port 30 coupled to a P I/O unit 32 of a buffer 16. A scatterer 36 has eight output ports 38a-h with the first output port 38a connected to the first word-segment 25a of the SBUS 24, the second output port 28b connected to the second word-segment 25b of the SBUS 24, and so on. A scatterer input port 40 is coupled to the P I/O unit 32.

An SMEM controller 42 is coupled to the control ports of the SMEM by a first control bus 46. An SBUS seqencer 48 has inputs for receiving the parameters STA, BWC, NC, IBR, and IBC, transferred on a register bus 50 coupled to working registers 52. The sequencer 48 and SM controller 42 are coupled by a second control bus 54 having a request (REQ) line, acknowledge (ACK) lines, read/write (R/W), block random select (B/R), address (ADR), and data transfer (DT) lines. The SBUS sequencer also receives a start block signal from an external source. A packer/scatterer control unit 60 receives initialization and control signals on PSCBUS 61. Additionally, the packer/scatterer control unit 60 provides word select signals to the packer 26 and scatterer 36 on word select (WS) line 62 and write enable and address signal to the buffer memory 34 on PWE and PADR lines 64 and 66. The word select signals are also provided to the SMEM controller 42 by PAWE lines 68 coupling the scatterer 36 to the SMEM CNT 42.

An overview of the operation of the system depicted in FIG. 2 will now be described with reference to FIGS. 1B, 1C, FIG. 2, and FIG. 2b, which is a timing diagram. The operation of the system is best understood with respect to a specific example, which utilizes four Zitel memory units connected in parallel. For these units, the first control bus 46 consists of a 6-line MBUS 46a upon which are sequential encoded address, R/W, and block/random (B/R) signals; a request (REQ) line 46b; a refresh line (RF) 46c; byte mark line (BM) 46d; a block minus four (BM4) line 46e; and an end of block line (EB) 46f.

A block read operation for these memory chips requires that the block signal, the read signal, and the starting address be provided over the MBUS 46a. A request signal is inserted for 100 ns followed by a 500 ns wait. This comprises the 600 ns set up time for a block read. The request signal is then inserted on a 50 ns on-off cycle with a wide word being read from the SMEM every 100 ns. The controller must provide a signal on the block minus four line (BM4) 46e, four words before the end of a block, and must provide the end of block signal (EB) at the end of the block transfer. These requirements limit a block read to a minimum of four wide words.

For a block write operation, the block signal, write signal, and starting address are provided on the MBUS 46a. The request signal is then asserted on a fifty ns on, fifty ns off, cycle with wide words being written into the SMEM on a 100 ns cycle time. Note that for a block write operation, data from the SBUS is written into every system word in the wide word.

A random read operation is performed by supplying a read signal, a random signal, an address on the MBUS 46a, and asserting the request signal for 200 ns. The cycle time for the read operation is 300 ns.

Turning now to a random write operation, two cases must be considered. A memory word in the Zitel memory unit is 64 bits wide. This memory word is divided into eight bytes and the unit has the capability of writing to a selected byte in the memory word. By activating a byte mark on the BM line 46e corresponding to a desired byte, only the bits in the desired byte may be written. However, due to error correction code requirements of the Zitel unit, the system word must be read from the memory and a merge operation performed. Accordingly, the cycle time for a partial write operation, i.e., a write to less than the entire system word in the Zitel memory, is 600 ns.

In the present system, the system words are 32-bits or half the width of a memory word of a single Zitel unit. Thus, a 32-bit system word is defined as either the first four bytes or last four bytes of a memory word. The controller 42 provides word marks, which are combinations of four byte marks, for defining system words to be written to during a partial write operation.

A second case to be considered is where all bytes in the system word are to be written to. In this case, no merge operation is required and the cycle time for the write operation is 400 ns.

The first operation described will be a block read operation having a 600 ns set up time with the cycle time of each wide word in the block being 100 ns. Referring to FIG. 2B, the clock WWCLK signal defines a 100 ns WW cycle time. The cycle times of the wide words in the block access are synchronized to the positive pulse of WWCLK.

In the present invention, only system words in a selected subarray are transferred from the bus to the buffer. If the subarray words were stored in adjacent storage elements of the wide word than eight system words per wide word cycle would be transferred to the buffer. If one word were transferred per clock pulse, then the clock (SWCLK) must have eight clock pulses for every WWCLK pulse. The packer/scatterer controller generates a word select signal, a buffer address signal (PADR), and a buffer write enable signal (PWE) for each pulse of the SWCLK signal. In a preferred embodiment, the packer is an 8:1 MUX for selectively coupling a packer input port to the packer output port. The word select signal is a three-bit control signal transferred from the select port of the packer/scatterer controller to the control port of the packer by the word select line 62.

Referring to WW1 of FIG. 1B, note that for the subarray $B_{ij}$ only two elements of the subarray are included in the first wide word. When WW1 is read onto the SBUS only the fifth and seventh words are transferred to the buffer. With reference to the first wide word of the transfer, the first subarray storage element in that wide word is characterized by the starting offset, $X_0$, being the position of the first subarray storage element in the wide word. For the first subarray storage element, $B_{00}$, $X_0$ is 5. The value $X_0$ is given by the three LSBs of the thirty-two bit of the starting address (STA) (with the twenty-nine MSB's being the wide word address). Subsequent offsets for the subarray elements in the same column are given by the three LSBs of $$S_n = X_0 + n*IBR \qquad \text{EQ. 4}$$

The starting offset for the first element in the next column, i.e., $B_{01}$, is the three LSBs of STA+IBC.

Accordingly, one function of the packer/scatterer controller 60 is to generate the offsets for the subarray elements of the given WW transferred to the SBUS 24 from the SMEM 12. These offsets for the given WW are generated during the WW cycle of the given WW. The packer-scatterer controller 60 also generates the PWE and PADR signals to write the subarray elements into selected locations of the buffer 16.

Several problems must be solved to implement the above-described functions. For example, the number of offsets generated for a given WW must be limited to the number of subarray words in the given WW. Thus, although the packer-scatterer controller must be able to generate eight offsets per WW cycle, for a given WW it actually generates only those offsets required to transfer the subarray elements from the SBUS to the buffer. For example, for WW1 in FIG. 1B, only the offsets 5 and 7 are generated during the first WW cycle. A second problem is that, for a 100 ns WW cycle, the word select signals, PWEs and PADRs must be generated on a 12.5 ns clock cycle and the access time of the buffer must be 12.5 ns or less. Memory elements operating at this high rate are either not generally available or are available at high cost. Preferred embodiments capable of solving these problems are described below with reference to FIGS. 3-9.

Turning now to a write SMEM operation, the word stored in the buffer 16 of FIG. 1C are to be written to the subarray locations of the SMEM 10 of FIG. 1B without disturbing the non-subarray elements of the subarray $A_{ij}$.

During the WW1 cycle, the packer-scatterer controller 60 sequentially generates the offsets X=5 and 7, to sequentially couple the scatterer input port 40 to the 5th and 7th scattering outports 38e and g. The appropriate PWE and PADR signals are synchronously generated so that the elements $B_{00}$ and $B_{10}$ are sequentially transferred to the 5th and 7th word-segments 25e and g of the SBUS 24. These offsets, X=5 and 7, are also transferred to the SMEM controller 48 over the partial write lines 68. The SMEM controller 48 enables a write operation only to those storage elements having $A_{SM}=5$ and 7 to sequentially write $B_{00}$ from the fifth word-segment 25e to the fifth storage element of WW1 and B₁₀ from the seventh word-segment 25a to the seventh storage element of WW1 during the first WW cycle. Thus, the words in the buffer are transferred to the subarray storage elements and the remaining array words in WW1 are left undisturbed.

As described above, memory components having a 12.5 ns access time are generally not available. In a preferred embodiment, an interleaved system operated on a 25 ns clock is utilized. FIG. 3 is a block diagram of a dual ported, double-buffer, memory system utilized in a preferred embodiment of the invention.

Referring now to FIG. 3, the buffer 16 includes a 0 and a 1 module 100 and 102. Each module 100 and 102 includes an odd and an even side, 100od,ev and 102od,ev. The PI/O unit 32 is coupled to the even and odd packer output ports 30 ev and od by an EVDATAINBUS 103 and an ODDATAINBUS 104 and to the even and odd scatterer input ports 40 ev and od by EVDATAOUTBUS 105 and ODDATAOUTBUS 106. A Z I/O unit 110 is coupled to a Z-BUS 112. PI/O bus 114 includes PEVWE, PODWE, PEVADR, and PODADR lines 66ev and od and 64ev and od. Odd and even select lines 62ev and 62od are coupled to the packer/scatterer controller 60. A configuration bus 120 couples externally-supplied PWEN, ZWEN, ZFO/PFO, and ZOD/EVSEL signals to the P I/O and Z I/O units 104 and 110.

In operation, one of the memory modules 100 or 102 may be coupled to the SBUS 24 through the packer/scatterer and the other memory module may be coupled to the ZBUS 112. In the case where the O memory module 100 is coupled to the SBUS 24, for each read or write SMEM operation, two system words may be transferred between the SBUS and the memory module for each SWCLK pulse.

During an SMEM write operation, a first subarray data word from the even module 100ev and second subarray data word from the odd module 100od may be simultaneously transferred to selected subarray storage elements 14 in a wide word during a single SWCLK period. During a SMEM read operation, system words from first and second subarray storage elements 14 may be transferred to storage elements in the even and odd modules 100ev and od during a single SWCLK Period.

The packer/controller 60 generates the required even and odd word select signals, even and odd address signals control the transfer of system words between selected word-segment 25 on the SBUS 24 and storage elements in the odd and even modules 100ev and od. The selection of which modules are to be coupled to the SBUS 24 and ZBUS 112 is controlled by externally setting the states of the PWEN, ZWEN, ZFO/PFO, and ZOD/EVSEL signals. A detailed functional description of the dual ported double-buffered memory system is provided below with reference to FIG. 8.

FIG. 4A is a block diagram of a packer/scatterer controller 60 utilized in a preferred embodiment of the present invention. This diagram does not show all elements, or connections between elements, but is intended to facilitate explaining the operation of the P/S controller 60. However, a complete set of schematic diagrams for the P/S Controller 60 is included as Appendix A, which may be found in the patented file.

Referring to FIG. 4A, latch 500 has an input port coupled to receive a LD signal and an output port coupled to select line 502. The latch 500 clock input is coupled to the SW clock.

An even ALU (EVALU) 504 includes a multiplexer 506 having its output coupled to a 16 bit even internal bus (EVINTBUS) 508. EVINTBUS 508 is coupled to the input port of latch L1 510. The output port of latch L1 is coupled to a 16-bit EVOUTBUS 512. EVOUTBUS 512 is coupled to the A input port of EVADDER 514. The B input of adder 514 is coupled to a 21BR bus 515. The sum output of EVADDER 514 is coupled to a 16-bit even feedback bus (EVFBBUS) 516. The EVFBBUS 516 is coupled to the B input port of MUX 506. The select port of MUX 506 is coupled to the select line 502. The A input of MUX 506 is coupled to XOBUS 513.

An odd ALU (ODALU) 520 includes an ODADDER 524 having its A input coupled to the EVOUT bus 512 and the B input coupled to an IBR bus 525. The sum output of the ODADDER 524 is coupled to 16-bit ODINTBUS 526. Latch L2 528 has an input port coupled to the ODINTBUS 526 and an output port coupled to an ODOUTBUS 530. The three lines of the EVOUTBUS 512 carrying the three LSBs of the digital signal form EVWSELBUS 540. Similarly, three lines of ODOUTBUS 530 form ODWSBUS 542.

The EVWSBUS 540 is coupled to the input port of an even delay element (EVDE) 543. The output port of the EVDE 543 is coupled to an EVWSOUTBUS 544. The ODWSBUS 542 is coupled to the input port of controllable odd delay element (CODDE) 545. The output port of the CODDE 545 is coupled to an ODWSOUTBUS 546.

A control circuit 549 includes a WW counter 550 having its clock input coupled to the 100 ns WW clock. The output port of the WW counter 550 is coupled to a 13-bit wide word count bus (WWCNT BUS) 552. A PW count PWCNT signal is coupled to a 16-bit PWCNT bus 554. Even WW comparator (EVWWCOMP) 556 has a B input coupled to the WWCNTBUS 552 and an A input coupled to the 13 MSBs of the EVOUTBUS 512. Even PWCNT comparator (EVPWCNTCOMP) 558 has its A input coupled to the PWCNT BUS 554 and its B input coupled to the EVOUT BUS 512. The output of the even comparators 556 and 558 are coupled to the inputs of an even logic network (EVLOG) 560 by lines 562 and 564. The output of the EVLOP 560 is coupled to an even enable line 566, with the even enable line 566 coupled to the enable input of the latch L1 510.

Odd WW comparator (ODWWCOMP) 570 has its a input coupled to the 13 MSBs of the ODOUTBUS 530 and its B input coupled to the WWCNTBUS 552. Odd PWCNT comparator (ODPWCNTCOMP) 572 has its A input coupled to the PWCNT BUS 554 and its B input coupled to the ODOUT BUS 530. Odd logic network (ODLOG) 544 has its inputs coupled to the outputs of the odd comparators 570 and 572 by lines 573 and 774. The output port of the ODLOG 544 is coupled to the odd enable line 576 which is coupled to the enable input of latch L2 528.

An even address counter 580 has its enable input port coupled to the output port of the EVLOG 560 by the EVWE line 582. An even WS delay element EVWSDE 583 delays the even WS signal by one SWCLK cycle. An odd enable address counter 584 has its enable port coupled to the output port of the ODLOG 544 by the ODWE line 586. A controllable odd WS delay CODWSDE 587 element either delays the odd WS by one SWCLK cycle or introduces no delay. The clock inputs of the even and odd address counter 580 and 584 are coupled to an ADCNTR clock generator (not shown). The output port of the even address counter 580 is coupled to an even address bus 590 and the output port of the odd address counter is coupled to the odd address bus 592.

As stated above, the packer/scatterer controller 60 sequentially generates the offsets, $X_n$, of the subarray words in a given WW during the cycle time of the given WW. The function of the OD-EV ALUs 504 and 520 will first be described. These ALUs can generate an odd and even offset each 25 ns. Referring to FIG. 4 and the timing diagram of FIG. 4A, prior to SWCLK pulse 1, latches L1 510 and LW 528 are reset to zero. The signal LD is set to select the A input of MUX 506 and on SWCLK pulse 0, the A input is selected and the starting offset, $X_0$, is placed on the EVINTBUS 508.

At SWECLK pulse 1, the LD signal selects input B of MUX 506, L1 510 is clocked, $X_0$ is transferred to the EVOUTBUS 512, $X_0$ is added to IBR by adder 524, the signal $EVX = X_0 + 2IBR$ is placed on the EVFBUS 516 and EVINTBUS 508, and the signal $ODX_1 = X_0 + IBR$ is placed on the ODINTBUS 526.

The WWCNT signal is incremented to 1 on the rising edge 600 of WWCLK. WWCNT is compared to the 13 MSBs of the signal on the EVOUTBUS 512 by EVCOMP 556 and the 13 bits of the signal on the ODOUTBUS 530 by ODCOMP 570. These comparators generate an enable if A is less than B and a disable signal if A is greater than or equal to B, where A and B are the numerical values of the signals at inputs A and B of the comparator(s).

The outputs of the comparators are coupled to EN inputs of latches L1 and L2 by enable lines 566 and 576 via EVLOG 560 and ODLOG 544. A disable signal at the EN input inhibits the latch from transferring signal from the input to the output port on receipt of a clock signal.

The PWCNT is equal to $X_0 + BWC$. PWCNT is compared to the signal (EVSN) on the EVOUTBUS 512 by EVCOMP 558 and to the signal (ODSN) on the ODOUTBUS 530 by ODCOMP 572. If the signal on the EVOUTBUS 512 is less than or equal to PWCNT, then the output from EVPWCNTCOMP 558 is an enable signal, otherwise it is a disable signal. Similarly, if the signal on the ODOUTBUS 530 is less than or equal to PWCNT, then the output of the ODPWCNTCOMP 572 is an enable signal, otherwise it is a disable signal.

If either of the signals at the inputs of EVLOG or ODLOG 560 and 537 are disable signals, then the output is a disable signal.

The operation of the packer/scatterer control system to control a read operation of the subarray C, depicted in FIG. 4C, from the SMEM to the buffer will now be described with reference to FIGS. 4A, B, C and Tables 1 and 2.

TABLE 1

| $S_n$ | Subarray Element | 13 MSB$_0$ | 3 LSBs | WS (decimal) |
|---|---|---|---|---|
| 1 | $C_{10}$ | 0...000 | 001 | 1 |
| 3 | $C_{20}$ | 0...000 | 011 | 3 |
| 5 | $C_{30}$ | 0...000 | 101 | 5 |
| 7 | $C_{40}$ | 0...000 | 111 | 7 |
| 9 | $C_{50}$ | 0...001 | 001 | 1 |
| 11 | $C_{60}$ | 0...001 | 011 | 3 |
| 13 | $C_{70}$ | 0...001 | 101 | 5 |
| 15 | $C_{80}$ | 0...001 | 111 | 7 |
| 17 | $C_{90}$ | 0...010 | 001 | 1 |
| 19 | | 0...010 | 011 | |

TABLE 2

| SWCLK | EV | | | | | OD | | | | |
|---|---|---|---|---|---|---|---|---|---|---|
| | INT | OUT | WS | WE | ADR | INT | OUT | WS | WE | ADR |
| | | | | | WWCNT = 1 | | | | | |
| 1 | 5 | 1 | 1 | EN | 1 | 3 | — | — | — | — |
| 2 | 9 | 5 | 5 | EN | 2 | 7 | 3 | 3 | EN | 1 |
| 3 | 13 | 9* | 1 | DIS | 2 | 11 | 7 | 7 | EN | 2 |
| 4 | 13 | 9* | 1 | DIS | 2 | 11 | 11* | 3 | DIS | 2 |
| | | | | | WWCNT = 2 | | | | | |
| 1 | 13 | 9 | 1 | EN | 3 | 11 | 11 | 3 | — | — |
| 2 | 17 | 13 | 5 | EN | 4 | 15 | 11 | 3 | EN | 3 |
| 3 | 21 | 17* | 1 | DIS | 4 | 19 | 15 | 7 | EN | 4 |
| 4 | 21 | 17* | 1 | DIS | 4 | 19 | 19** | 3 | DIS | 4 |
| | | | | | WWCNT = 3 | | | | | |
| 1 | 21 | 17 | 1 | EN | 5 | 19 | 19** | 3 | DIS | 4 |
| 2 | 25 | 21** | 5 | DIS | 5 | 19 | 19** | 3 | DIS | 4 |

Referring now to FIG. 4C, the starting offset of the array $C_{ij}$ is $X_0 = 1$, the increment between rows is $IBR = 2$, the block word count is $BWC = 16$, and $PWCNT = 17$. The sums ($S_n$) generated by the ALUs and their binary equivalents are listed in Table 1. Note that the first three LSBs of the binary equivalent of each $S_n$ define the WS signal, which is the offset of eacch subarray element within a given WW. The 13 MSBs of each binary sum, $S_n$, define the WW in which subarray element is located. The WW count of the 13 MSBs has its origin at 0.

Table 2 includes a listing of the values of the signals required to transfer the subarray C of FIG. 4C from the SMEM to the odd and even modules 100ev and od of the buffer 16. These values are organized vertically in time by the SWCLK pulse aligned to three WWCLK pulses. For the first WWCLK pulse, WWCNT = 1, for the second, WWCNT = 2, and for the third, WWCNT = 3.

The values (INT) and (OUT) of the signals on the internal buses 508 and 526 and output buses 512 and 530 of the even and odd ALUs 504 and 520 are listed for each SWCLK pulse along with the value (WS) corresponding to a decimal value of the 3 LSBs of (OUT). The state of WE signal generated by the EVLOG and ODLOG 560 and 544 and the value of the ADR generated by the OD and EV ADR CTRs 580 and 584 is also listed by SWCLK pulse.

A single asterisk next to an OUT value indicates the 13 MSBs in the binary representation is equal to or greater than the value of WWCNT. A double asterisk next to an OUT value indicates the value is greater than PWCNT. Either of these conditions will cause a disable signal to be generated by a corresponding EVLOG or ODLOG 560 or 544, thereby preventing the transfer of a signal from an INBUS to an OUTBUS via the disabled latch 510 or 528, preventing the generation of the next address by the disabled address counter 580 or 854, and preventing the transfer of a system word from the packer output port 30 to the buffer 16.

Referring to Table 2 and the timing diagram of FIG. 4A, when the WWCLK signal goes positive, the WW counter is incremented to 1. Thus the WWCNT=1 signal is placed at the B input of the EVWWCOMP 556 and the B input of the ODWWCOMP 570. Also, the signal PWCNTS=17 is placed at the A inputs of those comparators. The WW count remains at 1 while the SWCLK signal generates four pulses. Because two system words (even and odd) may be transferred for each SWCLK pulse, eight system words may be transferred during each output state of the WW CTR 550. At pulse 1, the starting offset is transferred to the EVOUTBUS 512 by latch L1 510. From Table 1, the WS signal is equal to 1. Therefore, the first word-segment 256 on the SBUS 24 is coupled to the output port 30ev of the even packer MUX 26ev.

Turning now to the address generation function, the even address counter 580 increments on the SWCLK pulses if an enable signal is provided to the enable input of counter 580. Because the signal on the EVOUTBUS 512 is 1, from Table 1 it is seen that the 13 MSBs are less than the WWCNT and less than the PWCNT so that neither of the even comparators 556 or 558 generates a disable signal. Accordingly, the even address counter is incremented to 1. Because the WE signal to the memory is an enable signal, the word on the first word-segment 256 of the SBUS 24 is transferred to the first storage element in the even buffer 16. During clock pulse 1, the signal on the EVOUTBUS, i.e., 1, is incremented by IBR and placed on the ODINTBUS 26. The value of this signal is equal to 3. However, no output signal is resident on the ODOUTBUS 530 during this clock cycle. The EVDES 543 and CODDE 545 align the even WS, WE, and ADR signals with the odd WS, WE, ADR signals so that $C_{10}$ and $C_{20}$ are transferred to ARD1 off the even and odd sides during the same SWCLK cycle.

Referring to the second SWCLK pulse cycle, the signal on the EVOUTBUS 512 is equal to 5, the offset is 5, the WE signal is an enable signal, the even address counter 580 increments the even address to 2, and the word on the fifth word-segment 25$f$, i.e., $C_{30}$, is transferred to the second storage element of the buffer. Additionally, during the second SWCLK cycle the word on the ODOUTBUS is equal to 3, the WS signal is 3, the WE signal is an enable signal, the odd address counter 584 increments to 1, and the word on the third word-segment 25$d$ of the SBUS 24, i.e. $C_{20}$, is transferred to the first storage element of the odd buffer.

Referring next to the third SWCLK pulse cycle, the word on the EVOUTBUS is equal to 9. Note from Table 1 that the 13 MSBs for 9 are equal to 1. Because the WWCNT is 1 and these 13 MSBs are equal to 1, the EVWWCOMP 556 generates a disable signal. Thus the WE signal is a disable signal, the even address does not increment but remains at 2, and no word is written into the even buffer during this cycle. Note that WW=1 defines the offset of the first word-segment of the subarray element for the second WW. Thus, the cooperation of the WW counter 550 and the even comparator 556 prevent the odd offsets from exceeding the WW boundary. Similarly, the word of the ODOUTBUS 526 has the value 11 and the value of WS is 3. From Table 1, the 13 MSBs of 11 equal 1 and therefore the WE is an inhibit signal and the odd address counter 584 is inhibited.

Referring now to clock cycle four, because the latches L1 and L2 are inhibited, the signal on the EVOUTBUS 512 and ODOUTBUS 526 do not change in value for the remaining SWCLK cycles of the WWCNT=1 WWCLK cycle. Both the address counters 580 and 584 remain inhibited.

During the second wide word clock cycle, the WW count signal is incremented to 2. The decimal value of the 16 bit signal on the EVOUTBUS 512 is 9 with the decimal value of the LSBs being 1. Thus WWCNT=EVOUT (3 LBSs) and the inhibit signal is removed from the output of EVLOG 560. Accordingly, the even WE is an enable signal, the even address is incremented to 3, and the word on the first word-segment 256 in the second WW, $C_{50}$, is read into the third storage element location in the even buffer. The offsets continue to be incremented during the second wide word count cycle until the 3 LSBs of the output on either the EVOUTBUS or the ODOUTBUS are equal to the WW count. At that time the disable signals prevent further transfer from the SBUS 24 to the buffer 16 until the WW count is incremented to 3. The single asterisk next to the even output signals indicate that the signal has been inhibited by comparison to the WW count signal. At SWCLK pulse 4 the decimal value of the signal on the ODOUTBUS 526 is 19. From Table 2, the decimal value of 3 LSBs of 19 are equal to WWCNT so ODWWCOMP 570 generates a disable signal. Additionally, 19 is greater than PWCNT so that ODPWCNTCOMP 572 also generates a disable signal.

Referring now to WW count =3, at clock pulse 2, the output signal on the EVOUTBUS is 21. This value exceeds the PWCNT signal and thus the EVPWCNTCOMP 553 generates an inhibit signal. Note that although the value 21 would define a subarray value according to the IBR=2 format, the PWCNT signal prevents the packer/scatterer controller 60 from generating offsets beyond the length of a column in the specified subarray.

Upon completion of the transfer of a column of the subarray from the buffer 16 to the SMEM 12 the packer/scatterer controller 60 is reset, the starting offset of the first element of the next column is loaded into the even ALU 504, and the above-described steps are repeated.

The comparison between WWCNT and the 3 LSBs of the signals on the ALU OUTBUS's 512 and 526 synchronizes the WS signals to the WW currently on the SBUS. The comparison between PWCNT and the signals on the ALU OUTBUSs 512 and 526 prevents the transfer of system words at addresses exceeding the last subarray word in a column.

The packer/scatterer controller generates the offsets "on-the-fly" at eight times the WW transfer rate. By utilizing an interleaved memory and simultaneously generating even and odd WS, and ADR signals on each SWCLK pulse the packer/scatterer controller 60 andd buffer elements 34ev and od can run on an SWCLK that is only four, instead of eight, times as fast as the WWCLK.

For an SMEM write operation, most of the above-described operations are utilized. The same WS signals control the scatterers 36ev and od and the generation of even and odd addresses is the same. The WE signals and WS signals are utilized by the SMEM controller 42 to enable only subarray storage elements 14 in the WW to be written from the SBUS 24. Thus, for example, during WWCNT=1 when $C_{10}$ is transferred from the buffer 34 to the first WS 25b, only the first storage element 14 in WW 1 of the SMEM 10 is write enabled. When $C_{20}$ is transferred to the third WS 25d, only the third storage element 14 is write enabled. Thus, the subarray words are written to subarray storage elements while the array words not included in the subarray are not disturbed.

FIG. 5 is a schematic diagram of packer 26ev and od. The SBUS 24 is coupled to the input port packer register 700. The output port of the packer register 700 is coupled to PINTBUS 704 and the CLK input is coupled to the 100 ns. WWCLK. The input ports of a PEVMUX 706 and a PODMUX 708 are coupled to the PINTBUS 704. The SEL input of PEVMUX 706 is coupled to the EVWSELBUS 544 and the SEL input of PODMUX 708 is coupled to ODWSELBUS 546. The output port of PEVMUX 706 is coupled to an EVDATAINBUS 103 and the output port of PODMUX 708 is coupled to an ODDATAINBUS 107.

In operation, each WW is clocked into the packer register 700 on the rising edge of WWCLK. The odd and even data subarray words are then transferred to the EVDATAINBUS 103 and ODDATAINBUS 104 by the OD and EV MUXs 706 and 708 under control of the odd and even WS signals generated by the packer/scatterer controller 60.

FIG. 6 is a schematic diagram of a scatterer 36ev and od. EVDATAOUTBUS 105 and ODDATAOUTBUS 106 are coupled to the output port of the EV and OD sides 100ev and od of buffer module 100 (FIG. 3). These buses are coupled to the input port of latches 806a–h via buffer drivers 808. An even decoder (EVDEC) 810 has its input port coupled to EVWSELBUS 540 and its 8 output ports coupled to EV control lines 812a–h. The EV control lines 812a–h are coupled to the enable input ports of respective latches 806a–h via OR gates 814a–h. An odd decoder (ODDEC) 820 has its input port coupled to ODSELBUS 542 and its 8 output ports coupled to OD control lines 82a–h. The OD control lines 822a–h are coupled to the respective enable input ports of latches 806a–h via OR gates 814a–h. The EV and OD control lines 812a–h and 822a–h are coupled to respective partial write lines 18a–h.

The output ports of latches 806a–h are coupled to respective word-segments 25a–h of the SBUS 24. The CLK inputs of latches 25a–h are coupled to the 25 ns SWCLK.

In operation, the subarray words from the buffer 34 are placed in the EV and OD OUTBUSES 800 and 802 on each SWCLK under control of the packer/scatterer controller 60. Each EVWS signal is decoded by EVDEC 810 and a selected EV control line enables the latch 806 coupled to the selected word-segment 25 of the SBUS 24. The subarray word is transferred to the selected word-segment 25 on the rising edge of the SWCLK signal.

Referring to FIG. 7, the operation of the buffer 34 and PI/O and ZI/O units 32 and 110 will now be described.

The externally controlled PWEN, ZWEN, and ZFO/PFO signals in cooperation with MUXs M1–M6 couple either the 0 buffer module 100 or 1 buffer module 102 to the DATA EV and DATA OD buses 900 and 902. The 0 buffer module 100 has even and odd elements 100ev (R1) and 100od (R2) and the 1 buffer module 102 has even and odd elements 102ev (R3) and 102od (R4). Assuming that the 0 module has been selected, the EVADR and EVWE signals are directed to R1 100ev by MUXs M7 and M9 under control of ZFO/PFO signal and the ODADR and ODWE signals are directed to R2 100od by MUXs M11 and M13. The module elements R3 and R4 102 EV and OD are similarly provided ZADR and ZWE signals by MUXs M8, M10, M12 and M14. The data ports of R3 and R4 are coupled to the ZBUS 112. Clearly, the functions of modules 0 and 1 100 and 102 may be swapped by changing the state of the external control signals. The DATA EV bus 900 is coupled to the EVDATAIN and EVDATAOUT buses 103 and 105 and the DATAOD bus 902 is coupled to the ODDATAIN and ODDATAOUT buses 104 and 106.

The buffer 34 is dual-ported because one module may be transferring data in an interleaved manner to or from the EV and OD data buses 900 and 902 while the other module is transferring data to or from the ZBUS 112.

The SBUS sequencer 48 will now be described with reference to FIGS. 8, 9a, and 9b. As described above, the purpose of the SBUS sequencer (SBUS SEQ) 48 is to optimize the rate of transfer of subarray data between the SMEM 12 and the buffer 16. The SBUS SEQ 48 examines the parameters of a particular column in a subarray, schedules a series of random and/or block transfers, and generates signals to control the SMEM controller 42 and packer/scatterer controller 60 to execute the scheduled transfers. The scheduling parameters include the constraints of the SMEM 12 and the starting offset, number of wide words, and IBR of a particular column in the subarray.

For a read operation, the constraints of the SMEM 12 require that the column to be transferred include at least four wide words to perform a block read operation. If the column is longer than four wide words, then the relative efficiency of the random and block read modes is determined by the amount of fluffy data between each subarray element in the column. The measure of the number of non-subarray elements between each element of a column is given by the IBR. In the case where IBR is less than 32, the block mode optimizes the data transfer rate; while in the case where IBR is equal to or greater than 32, a series of random transfers results in a greater data transfer rate. Thus, the SBUS SEQ 48 examines the number of words in the column and the IBR to determine whether a block or a random read operation is scheduled.

For a write operation, the block mode cannot be utilized unless IBR is equal to 1. In the block write mode, data from the SBUS is written into each system word location of the wide word. If IBR were not equal to 1, non-subarray storage elements would be included in the wide word and the data in these non-subarray storage elements would be destroyed by the block write operation. However, even if IBR is equal to 1, a block mode may be utilized only in the special cases where the starting offset $X_0$ is zero and where BWC is a multiple of eight. For example, if $X_0$ were not zero, then a random partial write operation must be utilized to write data into the first wide word of the column to prevent disturbing data in non-subarray words to the left of the offset. Further, if $X_0+BWC$ is not a multiple of eight, then the last system word in the column is located in the middle of a wide word. Therefore, a random partial write operation must be utilized for this last word of the column to prevent disturbing data in non-subarray storage elements to the right of the last system word in the column. In these cases, the sequencer schedules a RANDOM-BLOCK-RANDOM (RBR) operation.

FIG. 8 is a flow chart illustrating the decision tree for determining whether to schedule a random, block, or RBR SMEM write operation.

The invention will now be more fully described with reference to FIGS. 9a and 9b, which are medium-level schematic diagrams illustrating the operation of the invention.

All connections and control signals are not shown or defined in these figures. However, a complete schematic diagram of the SBUS sequencer is included in Appendex B, which may be found in the patented file.

Referring now to FIG. 9a, the working registers 52 include an IBC register 52a for storing the increment between columns, a DXSTA register 52b for storing the starting address of the subarray, an SQBWC register 52c for storing the block word count parameter, an SQIBR register 52d for storing the increment between rows parameter, and a column counter 52e for storing the number of columns parameter (NC).

A next column ALU 900 includes the IBC register 52a, adder 902, register 904, MUX 906, and the DXSTA register 52b. The outputs of the IBC register 52a and MUX 906 are connected to the A and B in ports, respectively, of adder 902 by 32-bit bus 908 and STRAD bus 910. The sum output of adder 900 is coupled to the input port of register 904 by bus 911. The output port of register 904 is coupled to the second input port of MUX 906 by bus 912 and the output port of the DXSTA register 52b is coupled to the first input port of the MUX 906 by bus 914. The load input port of register 904 is coupled to the LDNXTCOLADR line 916.

An SBADRALU 918 includes counter 920, multiplexer 922, adder 924, and multiplexer 926. The multiplexer 922 has a first input connected to the STRAD bus 910 and a second input coupled to AALU bus 928. The output port of multiplexer 922 is coupled to the input port of counter 920 by an ADMX line 930. The counter 920 includes a load input coupled to LDCTR line 932 and also includes an increment input port. The output port of the counter 920 is coupled to MADDR bus 934. Bus 934 also branches into SB address bus 936. The A and B input ports of adder 924 are coupled to the MADDR bus 934 and a BRAD bus 938. The output port of MUX 926 is also coupled to the BRAD line 938. The first input port of MUX 926 is coupled to the output port of the SQIBR register 52 by SQUIBR bus 940.

A word count ALU (WCNTALU) 940 includes a counter 942 and adder 944. The A input port of adder 944 is coupled to the SQBWC register 52c BWC bus 946 and the B input port is coupled to the first three bit lines of the STRAD bus 910. The sum port of adder 944 is coupled to the input of counter 942 by bus 948. The output port of counter 942 is coupled to PWCNTBUS 949. A decrement port of counter 942 is coupled to a control logic unit 960 by decrement line 962.

A comparator 950 has an A input coupled to the MADDR line 934 and a B input coupled to the sum port of adder 944 by bus 952. The output port of comparator 550 is coupled to an EORND line 954.

The control logic unit 960 has input ports coupled to the STRAD bus 910, the BWC bus 946, the SQIBR bus 940, and the EORND line 954. An RBR counter 970 has an output port coupled to the control logic unit 960 by a count line 972 and has increment and reset ports coupled to the control logic unit 960 by increment and reset lines 974 and 976. A three-bit NAND logic gate 978 is coupled to the first three bit lines of the PWCNT bus 949 and is coupled to an input port of the control logic unit 960 by WCEM8 line 980.

Other control lines from the CLU 960 having connections not explicitly depicted in FIG. 10A are shown symbolically by CNTBUS 981. These lines are coupled to selected control input ports, labeled CNT, of the various elements to achieve the functions described below.

The column counter 52e has an output port coupled to an SB request PAL 990 by EMLO line 992. An external start port 994 is coupled to the load port of the column counter 52e and input ports of the SB request PAL 990 and control logic unit 960. The second control bus 54 coupling the SB sequencer to the memory controller includes SB REQ line 994 coupled to the output port of SB REQ PAL 990, SB R/W line 996, and B/R line 998 coupled to output ports of the control logic unit 960, and multiplexed SB ADR/BOP line 1000 coupled to the output ports of counters 920 and 949 by multiplexer tristate buffers 1002 and 1004. The second control bus 54 also includes incoming lines SB acknowledge (ACK) 1006 and SBDT line 8. SB ACK 1006 is pipelined by registers 1010 and 1012 and the DT line 1008 is buffered by register 1014.

A register file 1020 has input ports coupled to the first thirteen bits of the MADDR bus 934, the first three bits of the STRAD bus 910, the SB/R/W line 996, the B/R line 998, the SBDT line 1008. It is also coupled to receive control signals from the control logic unit 960. The output ports of the packer register file 1020 is coupled to the PSCBUS 61.

A more complete depiction of the control logic unit 960 is provided in FIG. 9B. The control logic unit 160 includes a NEXT COLUMN PAL 1050, a RBR PAL 1052, and a DEC WORD COUNTER PAL 1054. An IBR limits comparator 1056 receives the IBR parameter and generates signals indicating whether IBR is less than or equal to 32, greater than or equal to 2, greater than or equal to 8, or greater than 32. Additionally, a BWC comparator 1058 indicates whether BWC is greater than or equal to 3, and an offset comparator 1060 indicates whether the starting offset is equal to 0.

The decision-making capacity of the sequencer is resident in the PALs 1050, 1054 of the control logic unit 960. The state equations of these PALs are included in Appendix B, which may be found in the patented file. The execution of a block, random, and RBR sequence operation will now be described with reference to FIGS. 9A and 9B.

Considering first the block transfer of a column of data, the MUX 906 of the next column ALU is controlled to couple the DXSTA register 52b to the output port of the MUX 906. Accordingly, the signal on the STRAD bus 910, i.e., STRAD (0), is equal to the starting address of the first column of the subarray. The starting address is added to IBC by adder 902 and the output signal on bus 910 is equal to the starting address plus IBC, i.e., STRAD (1). MUX 922 in the SB ADR ALU 918 couples the STRAD line to the output port of MUX 922. A load signal loads the STRAD signal into counter 920. Accordingly, the STRAD (0) signal is placed on the SB address line 936 and the MADDR line 934.

The three least significant bits of the STRAD (0) signal are added to BWC by adder 944 to generate a PSMBWC signal. The PSMBWC signal is loaded into the counter 942 via bus 948. This PSMBWC signal increases BWC by one wide word if the starting offset is not zero. This addition provides a ceiling on the block and prevents the truncation of the column due to overlap caused by the starting offset not being equal to zero.

The three least significant bits of STRAD ($X_0$) are loaded into the packer register files and the thirteen LSB of the PSMBWC signal are loaded into the packer register files and transferred to the packer/scatterer controller via the first control bus 61. The SB address and block operation (BOP) signals are multiplexed to the system memory controller via bus 1000.

The block is then transferred word-by-word between the SMEM controller and the buffer via the SBUS and the subarray words are selected by the packer/scatterer controller 60 as described above.

When the block operation is completed for the first column, the column counter 52e is decremented by 1 by the DECOLCTR signal generated by the control logic unit 960, the multiplexer 960 couples register 904 to the multiplexer output, and the LDNXTCOLADR signal on line 916 is asserted to transfer the STRAD (1) signal from the register input to the register output. Accordingly, the STRAD (1) signal is now resident on the STRAD bus 910. If the next column of the subarray is to be transferred via the block mode then the above-described operations will be repeated with STRAD (1) operating as the starting point of the transfer.

A random operation will now be described. The operation of the next column ALU 900 is essentially as described above for the block transfer. However, the SB address ALU 918 functions differently. The MUX 922 couples the STRAD line to the counter 920 to load the starting address (STA) of the column into the counter. This address is then provided to the SMEM controller 42 via the SB ADR/BOP BUS 1000. This addressed word is accessed by the random access mode. Subsequently, for the remaining subarray words in the column, the multiplexer 922 couples the sum output of the adder 924 to the input port of the counter 920. Thus, the starting address (STA) of the column is added to successive multiples of IBR, i.e., SB ADR=STA+n-*IBR.

Each succeeding sum is utilized for a subsequent random access of the SMEM 12 until all the words in a given column are transferred between the SMEM 12 and the buffer. The three least significant bits of the SB address signals on the MADDR bus 934 are utilized as the PWCNT signal to control the packer/scatterer controller to transfer only one system word for each wide word accessed.

The comparator 950 is utilized to determine the end of the column. The output from the sum input of adder 944, i.e., STRAD+BWC, is transferred to the B input of comparator 950 and the MADDR signal is coupled to the A input. The signal on the MADDR line 34 is equal to SMBWC when the last wide word in the column is accessed. At this time, comparator 950 generates the EORND signal to alert the control logic unit 960 that the column has been completely transferred. The control logic unit then generates a DECOLCTR signal to decrement column counter 520e and initiate the transfer of the next column in the subarray.

A special random transfer mode must be utilized if IBR is less than 8. In this case, the succeeding SB addresses generated by the address ALU 918 could access the same wide word. For example, if IBR were equal to 2 and $X_0$ were equal to 0 then the first wide word of the column would be accessed four times using the above-described procedure. Accordingly, when IBR is less than 8, a multi random signal is generated by the control logic unit. The control logic unit 960 increments the counter 920 in the address ALU 918 to access successive wide words during the multi random access of a column.

For each of the above random access modes, the word counter in the packer scatterer control unit is jammed to zero.

The random-block-random sequencer mode will now be described. As described above, for this case IBR=1 but the column is not aligned with the wide word boundaries so that a partial write must be used on either the first or last wide word, or both the first and last wide words, to prevent disturbing non-subarray data. In the present system, the above-described cases are not differentiated then the first and last wide words of the column are accessed by a random partial write operation while the central part of the column is accessed by a block operation. The phases of the random-block-random operation are defined by the output of the RBR index counter 970.

As above, the starting address of the column is loaded into counter 920 of the SB address ALU 918 and the PSMBWC signal, (STRAD (0:2)+BWC), is loaded into counter 942 of the WCNTALU 940. During RBR index cycle 00, the PWCNT signal to the packer/scatterer controller is forced by 0 by control signals from the control logic unit 960. This signal thus inhibits the packer/scatterer controller from preceding beyond the boundary of the first wide word. After the starting address is transferred to the SMEM controller a random partial write is executed. The word stored in counter 942 is decremented by two so that PWCNT=PSMBWC−2. The three LSBs of the PWCNT signal in the packer register file 1020 are forced to zero by the FLSWC1 signal to force the PWCNT signal to be a multiple of eight. The number in the address counter 920 of the SB address ALU 918 is incremented by one so that SB ADR=STA+1.

During the 01 index cycle, the block operation is performed where the starting address for the block is equal to STA+1 and the PWCNT=PSMBWC−2. Thus the block access begins at the second wide word of the column and ends at the wide word preceding the last wide word of the column. From the above analysis it is clear that all the stored elements in these wide words are included in the subarray.

During index cycle 10, the last word of the column is accessed by a random partial write operation. The word stored at the address counter 920 is incremented by one so that SB ADR=STA+2. The multiplexer 926 is controlled to couple the output of counter 942 to the B input of adder 924. Thus, the signals (STA+2) and (PSMBWC−2) are added to give the address for the last wide word of the column. This address is loaded into the address counter 922 and transferred to the SB address bus 936. The FLSWC1 signal is removed, to unmask the three LSBs of the PWCNT signal. These LSBs are used to stop the scatterer at the correct point in the last wide word.

Finally, during the 11 index cycle, the column counter is decremented.

At the end of the transfer of a column in either the random, block, or RBR mode, the CLU 960 generates a DECOLCTR signal to decrement the NC parameter stored in the COLCTR 52e. When all the columns of a subarray have been transferred, this stored parameter will be zero and an EMLO signal will be generated. The SBREQ PAL 990 responds to the EMLO signal by removing the SB REQ signal from the SB REQ line 994.

The above-described SMEM sequencer 48 is a hardwired embodiment that it capable of decision-making and execution at the clock rate desired to maximize the throughput rate between the SMEM 12 and the buffer 16. It is recognized that the above-described functions could be performed by a microprogrammed CPU. However, such an embodiment would require a great sacrifice in the speed of operation of the sequencer and, thus, the transfer rate.

The SMEM controller 42 will now be described with reference to FIG. 10. In FIG. 10, the second control bus 54 is coupled to interface 1200. Interface 1200 is coupled to an encoder 1202 by an internal bus 1204. Additionally, the encoder 1202 has input ports coupled to the partial write enable lines 68. The output ports of the encoder 1202 are coupled to the first control bus 46.

The following is a brief description of the protocol controlling communication between the SBUS sequencer 48 and the SMEM controller 42. The SBUS sequencer 48 requests access to the memory 12 by asserting the request and R/W signals. The memory controller 42 arbitrates request signals and provides an acknowledge signal when it is ready to service the SBUS sequencer 48. The SBUS sequencer 48 then may drop its request. When the memory controller 42 is ready to begin the data transfer it asserts the DT signal.

The encoder 1202 generates the appropriate signals to operate the specific SMEM 12 utilized in the embodiment in response to the signals provided by the SBUS sequencer 48. The implementation of the encoder 1202 uses standard digital technology and is not considered a critical part of the present invention.

The invention has now been described with reference to specific preferred embodiments. In particular, various memory systems may be substituted for Zitel systems. Also, the described configuration of digital components utilized in the hardware embodiment may be varied according to a standard engineering practices. Therefore, the invention is not limited to these described embodiments, but is defined by the appended claims.

What is claimed is:

1. In a data transfer apparatus including a system memory (SMEM) having its storage elements organized into wide words (WW) having addresses $A_{WW}$, each WW consisting of W system words, with a location of each system word in a WW given by an offset (X), with each system word also identified by a system memory address, $A_{SM}$, and with the system memory having a data I/O port and a control port, said data transfer apparatus also including a buffer memory having a data I/O port and a control port, where the system memory has an array of storage elements defined as sequentially addressed system word storage elements and with a selected subarray of storage elements embedded in the array defined by a starting address, an increment between rows (IBR) of the elements of the selected subarray and an increment between columns (IBC) of the elements of the selected subarray and a number of columns (NC), an improved system for transferring data from said selected subarray to said buffer during an SMEM read operation and from said buffer to said selected subarray during an SMEM write operation comprising:

a system BUS (SBUS) including W word-segments, said system BUS coupled to the SMEM data I/O port so that the system words stored in the storage elements of a WW of said SMEM are transferred to corresponding word-segments of said SBUS during an SMEM read and so that the system words on said word-segments are transferred to corresponding storage elements in the WW during a SMEM write operation;

a packing MUX for controllably coupling a selected word-segment of said SBUS to the I/O port of said buffer memory;

a scattering DEMUX for controllably coupling the I/O port of said buffer memory to a selected word-segment of said SBUS;

read control means, coupled to said SMEM, said packing MUX, and said buffer memory, for controlling said SMEM to transfer a subarray WW, being a WW including subarray system words stored in storage elements of said selected subarray, to said SBUS, with said subarray WW being on the SBUS for one WW cycle, for controlling said packing MUX to sequentially couple only the word-segments of the SBUS having subarray system words thereon to the data I/O port of the buffer memory during said WW cycle, and for sequentially writing the subarray system words transferred by said packing MUX to the I/O port of said buffer memory into selected storage locations in said buffer during said WW cycle; and write control means coupled to said SMEM, said scattering DEMUX, and said buffer memory for sequentially reading system words to be stored in the subarray storage elements from selected storage elements in said buffer memory, for controlling said scattering DEMUX to sequentially couple the I/O port of said buffer memory to only the subarray word-segments of SBUS corresponding to the subarray storage locatins of a given WW in said SMEM, and for sequentially writing each system word, transferred from said buffer memory to said subarray word-segments, into subarray storage locations of said given WW in said SMEM.

2. The invention of claim 1 wherein the SMEM has a block access mode and a random access mode, with the block access mode requiring a start address and a number of WWs in a block, and characterized by a block mode start-up time, BMS, and a block mode access time, BMAT, and with the random mode requiring an address and characterized by a random mode access time, RMAT, where BMAT is less than RMAT, and wherein said read control means and write control means further comprise:

sequencer means for receiving parameters defining said subarray in said SMEM and for generating control signals to sequence block mode and random mode read operations to optimize a rate of transfer of the subarray system words of said subarray between said SMEM and said buffer.

3. In a data transfer apparatus including a system memory (SMEM) having its storage elements organized into wide words (WW) having addresses $A_{WW}$, each WW consisting of W system words, with a location of each system word in a WW given by an offset (X), with each system word also identified by a system memory address, $A_{SM}$, with the system memory having a data I/O port and a control port, said data transfer apparatus also including a buffer memory having a data I/O port and a control port, and with the system memory having a block access mode and a random access mode, with the block access mode requiring a start address and a number of WWs in a block (PWCNT), and characterized by a block mode start-up time, BMS, and a block mode access time, BMAT, and with the random mode requiring an address and characterized by a random mode access time, RMAT, where BMAT is less than RMAT, where the system memory has an array of storage elements defined as sequentially addressed system word storage elements and with a selected subarray of storage elements embedded in the array defined by a starting address, an increment between rows (IBR) of the elements of the selected subarray and an increment between columns (IBC) of the elements of the selected subarray and a number of columns (NC), an improved system for transferring data from said selected subarray to said buffer during an SMEM read operation and from said buffer to said selected subarray during an SMEM write operation comprising:

- a system BUS (SBUS) including W word-segments, said system BUS coupled to the SMEM data I/O port so that the system words stored in the storage elements of a WW of said SMEM are transferred to corresponding word-segments of said SBUS during an SMEM read and so that the system words on said word-segments are transferred to corresponding storage elements in the WW during a SMEM write operation;
- a packing MUX for controllably coupling a selected word-segment of said SBUS to the I/O port of said buffer memory;
- a scattering DEMUX for controllably coupling the I/O port of said buffer memory to a selected word-segment of said SBUS;
- read control means, coupled to said SMEM, said packing MUX, and said buffer memory, for controlling said SMEM to transfer a subarray WW, being a WW including subarray system words stored in storage elements of said selected subarray, to said SBUS, with said subarray WW being on the SBUS for one WW cycle, for controlling said packing MUX to sequentially couple only the word-segments of the SBUS having subarray system words thereon to the data I/O port of the buffer memory during said WW cycle, and for sequentially writing the subarray system words transferred by said packing MUX to the I/O port of said buffer memory into selected storage locations in said buffer during said WW cycle; and
- write control means coupled to said SMEM, said scattering DEMUX, and said buffer memory for sequentially reading system words to be stored in the subarray storage elements from selected storage elements in said buffer memory, for controlling said scattering DEMUX to sequentially couple the I/O port of said buffer memory to only the subarray word-segments of SBUS corresponding to the subarray storage locations of a given WW in said SMEM, and for sequentially writing each system word, transferred from said buffer memory to said subarray word-segments, into subarray storage locations of said given WW in said SMEM with both read control means and write control means including:
- sequencer means for receiving parameters defining said subarray in said SMEM and for generating control signals to sequence block mode and random mode read operations to optimize a rate of transfer of the subarray system words of said subarray between said SMEM and said buffer;
- an SMEM controller for generating initialization and synchronization signals to control a read/write mode of said SMEM in response to SMEM control signals received from said sequencer means and for generating a data strobe signal when a word is transferred between the SMEM and the SBUS;
- a packer/scatterer controller for controlling said packing MUX and said scattering DEMUX in response to initialization, synchronization, and control signals from said sequencer means and SMEM controller; and
- a clock generator for generating a WWCLK signal, that defines WW cycles, and for generating an SWCLK signal, that defines system word cycles, with a SWCLK rate being a selected factor times a WWCLK rate.

4. The invention of claim 3 wherein said sequencer means is a sequencer that receives externally generated signals specifying the starting address (STA), number of consecutive system word storage elements from the start to finish of the subarray (BWC), number of columns (NC), increment between columns (IBC), and increment between rows (IBR) of the selected subarray, said sequencer for sequencing and executing a set of random and/or block read operations, for providing a block/random select signal (B/R), address signal, and R/W signal to said SMEM controller and for providing initializing and synchronization signals specifying a starting offset, an IBR, and a total WW count with the WW count being a number of words in a specified block to be transferred to said packer controller;

wherein said packer MUX has a W MUX input ports, each coupled to a respective one of said word-segments of the SBUS, with each input port specified by an offset index, X, said packer MUX also having a MUX output port and having a MUX control port for receiving a MUX control signal specifying the offset index, X, to control the packer MUX to couple an Xth MUX input port to the MUX output port, with said MUX output port coupled to the data I/O port of the buffer memory; and wherein said packer/scatterer controller has inputs for receiving initialization signals from said sequencer, for receiving said WWCLK and SWCLK signals, and for receiving said data strobe signal, said packer/scatterer controller for providing packer MUX control signals specifying offsets of the system words in each WW of the specified block to control the packer MUX to sequentially transfer the subarray words on the SBUS to the packer MUX output port and for providing buffer addresses, the packer/scatterer controller also for providing write enable signals to said buffer at said SWCLK rate to write such subarray word transferred to the packing MUX output port into a selected storage location in said buffer memory.

5. The invention of claim 4 wherein:
said write control means and said SMEM controller includes partial write enable means to synchronously write enable only the storage elements in said SMEM identified by the offset generated by said packer/scatterer controller on a given SWCLK pulse;
said buffer includes odd and even sides having an OD I/O port and EV I/O port respectively;

said packer controller generates even and odd offsets, write enable, and buffer address signals on selected SWCLK pulses; and said SWCLK rate is equal to a factor of W/2 times the WWCLK rate so that two subarray words may be transferred between said buffer and said SBUS on each selected SWCLK pulse.

6. The invention of claim 5 wherein said packer/scatterer controller includes:

a WWCNTR for generating a WWCNT signal which is incremented by said WWCLK;

an ALU for generating an N-bit SN signal where SN is set equal to the starting offset of the first subarray word in a WW at the start of a WWCLK cycle and where SN is incremented by IBR on selected SWCLK signals, and for inhibiting the incrementing of SN upon receipt of a disable signal, with XLSB least significant bits of SN forming a word select signal and with (N-XLSB) most significant bits of SN forming a WW index signal (WWIND);

an address counter for generating an ADR signal, with said ADR signal being incremented on selected SWCLK pulses, and for inhibiting the incrementing of said ADR signal upon receipt of a disable signal;

a WW comparator for comparing the WWIND signal with said WWCNT signal and for providing a disable signal to said ALU and said address counter when WWIND is greater than or equal to WWCNT; and a PW comparator for comparing SN to a PWCNT signal, with PWCNT being a sum of BWC and the starting offset, and for providing a disable signal to said ALU and said address counter when SN is greater than PWCNT.

7. The invention of claim 6 wherein said sequencer comprises:

a next column ALU for generating the starting addresses of successive columns in the subarray;

a SBADR ALU for generating addresses for random or block accesses from said SMEM;

a WCNT ALU for generating a block operation signal specifying a number of words in a block.

* * * * *